US011677990B2

(12) United States Patent
Burkhart et al.

(10) Patent No.: US 11,677,990 B2
(45) Date of Patent: Jun. 13, 2023

(54) MULTI-CAMERA LIVE-STREAMING METHOD AND DEVICES

(71) Applicants: Robert Bradley Burkhart, Agoura Hills, CA (US); Peter Christian Maurer, Sherman Oaks, CA (US)

(72) Inventors: Robert Bradley Burkhart, Agoura Hills, CA (US); Peter Christian Maurer, Sherman Oaks, CA (US)

( * ) Notice: Subject to any disclaimer, the term of this patent is extended or adjusted under 35 U.S.C. 154(b) by 0 days.

(21) Appl. No.: 17/977,998

(22) Filed: Oct. 31, 2022

(65) Prior Publication Data
US 2023/0052665 A1 Feb. 16, 2023

Related U.S. Application Data

(63) Continuation of application No. 17/374,874, filed on Jul. 13, 2021, now Pat. No. 11,490,130, which is a continuation of application No. 16/199,175, filed on Nov. 24, 2018, now Pat. No. 11,064,221.

(51) Int. Cl.
*H04N 21/2187* (2011.01)
*H04N 21/8549* (2011.01)
*H04N 21/218* (2011.01)
*H04N 21/81* (2011.01)
*H04N 7/18* (2006.01)

(52) U.S. Cl.
CPC ....... *H04N 21/21805* (2013.01); *H04N 7/181* (2013.01); *H04N 21/2187* (2013.01); *H04N 21/812* (2013.01); *H04N 21/8549* (2013.01)

(58) Field of Classification Search
CPC ............. H04N 21/21805; H04N 7/181; H04N 21/2187; H04N 21/812; H04N 21/8549
USPC ......................................................... 348/157
See application file for complete search history.

(56) References Cited

U.S. PATENT DOCUMENTS

| | | | |
|---|---|---|---|
| 2018/0152736 A1* | 5/2018 | Alexander | H04N 21/4223 |
| 2019/0299073 A1* | 10/2019 | Vollbrecht | G06V 20/52 |
| 2020/0114240 A1* | 4/2020 | Shachar | G06T 7/292 |

* cited by examiner

*Primary Examiner* — Jae N Noh
(74) *Attorney, Agent, or Firm* — Edmond A. DeFrank

(57) ABSTRACT

The embodiments disclose a method including capturing video footage of a youth sports event using at least one video camera with a mobile application installed, transmitting to at least one network server with internet and WI-FI connectivity mobile application multi-camera live-streaming video camera captured game footage, recording on at least one database coupled to the network server at least one video camera mobile application multi-camera live-streaming video camera captured game footage, using at least one network computer coupled to at least one network server configured for processing and displaying multi-camera live-streaming video camera captured game footage for live video streaming game broadcast on a plurality of subscribed viewer digital devices, and mixing advertising into the processed multi-camera live-streaming video camera captured game footage broadcast using the at least one network computer.

20 Claims, 19 Drawing Sheets

MULTI-CAMERA LIVE-STREAMING METHOD AND DEVICES

CROSS-REFERENCE TO RELATED APPLICATIONS

This application is a continuation of prior U.S. application Ser. No. 17/374,874, filed Jul. 13, 2021, entitled "MULTI-CAMERA LIVE-STREAMING METHOD AND DEVICES", by Robert Bradley Burkhart et al., which is a continuation of prior U.S. application Ser. No. 16/199,175, filed Nov. 24, 2018 and now issued as U.S. Pat. No. 11,064,221, entitled "MULTI-CAMERA LIVE-STREAMING METHOD AND DEVICES", by Robert Bradley Burkhart et al., both '874 and '175 are herein incorporated by reference in their entirety.

BACKGROUND

Youth sports are an enormous untapped market for original content. Every parent wants to capture their kids' game on video. Coaches and players want video too. But it's not easy with a single camera usually far away from the action. A single camera doesn't offer the best experience for events, especially sports. Multi-cam emulates what we all expect from watching sports on TV.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of multi-camera live-streaming method and devices is described for illustrative purposes and the underlying system can apply to any number and multiple types sporting events. In one embodiment of the present invention, the multi-camera live-streaming method and devices can be configured using an electronic application to record and access multi-camera sports video. The multi-camera live-streaming method and devices can be configured to include ground level video cameras and can be configured to include drone mounted video cameras to capture aerial footage using the present invention.

The term "multi-camera live-streaming method and devices" can be referred to herein as "VIDGO" and/or "mobile application", "mobile app", "VIDGO APP" without any change in meaning. The descriptions herein make reference to football as a game and piece of sports equipment, but any sport and corresponding piece of sports equipment can be substituted without changing any meanings or interpretations of the embodiments with obvious context exceptions for example people pass a football but throw a baseball.

Figure 1:
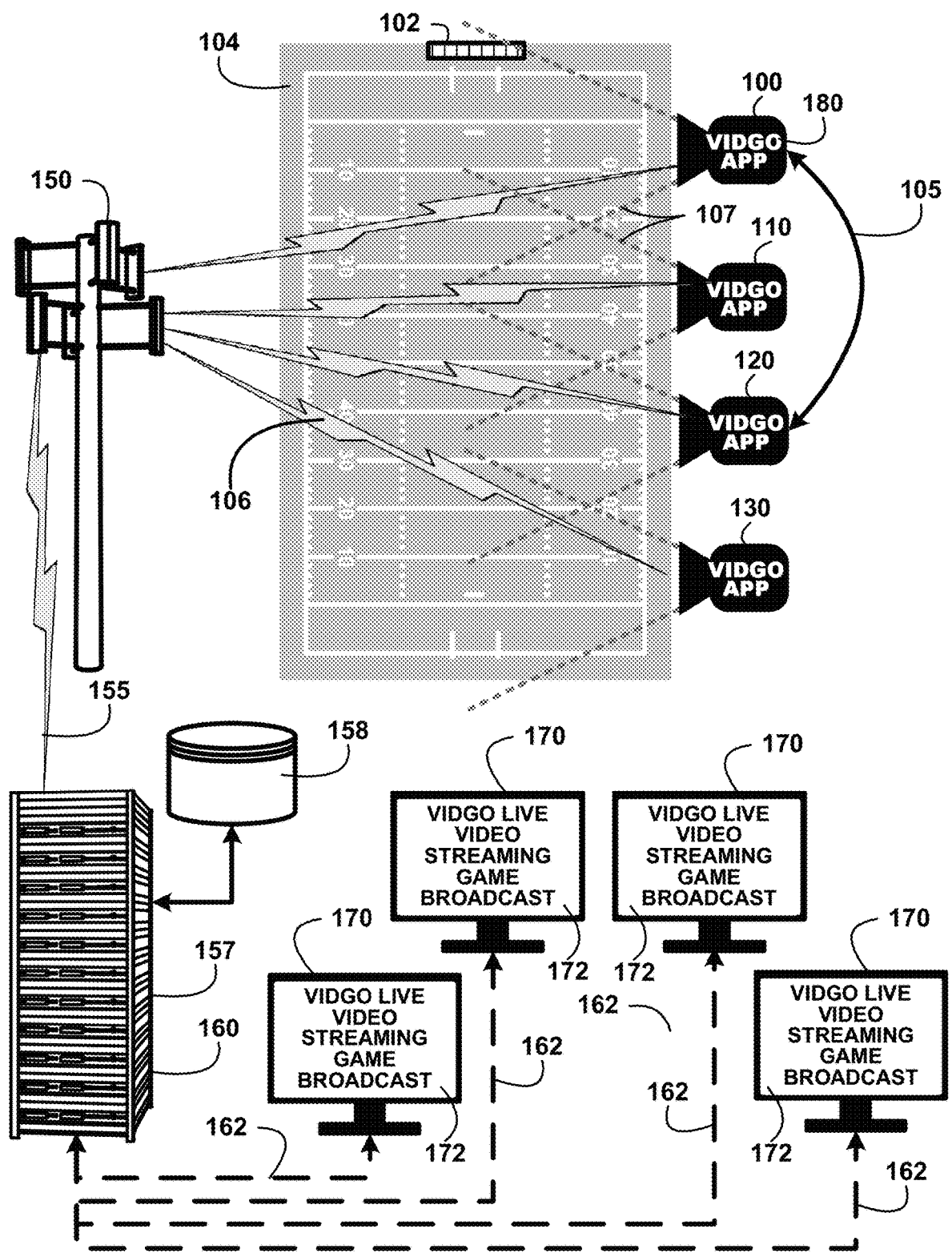
FIG. 1 shows for illustrative purposes only an example of an overview of a multi-camera live-streaming method and devices of one embodiment.

FIG. 1 shows for illustrative purposes only an example of an overview of a multi-camera live-streaming method and devices of one embodiment. FIG. 1 shows sports venue for example a high school football field 104. Positioned on one side of the football field 104 are four video cameras including smart phone cameras with overlapping fields of view 107. Camera #1 100 with VIDGO app 180 installed includes a view of a scoreboard 102. Progressing along the sideline are camera #2 with VIDGO app installed 110, camera #3 with VIDGO app installed 120 and camera #4 with VIDGO app installed 130. Each camera produces a VIDGO app 180 camera cellular transmission 106 of the footage being captured. Each of the VIDGO app 180 installed smart phone cameras can send and receive phone calls and texts while maintaining the video capture. The VIDGO app 180 installed smart phone camera users can ping 105 each other using an assigned unique ID during the live streaming to maintain communications for example an alert that the current play is moving in the direction of their field of view of one embodiment.

The VIDGO app camera cellular transmission 106 of each camera is received by one or more cellular tower 150. The cellular transmissions 155 are transmitted to a VIDGO network server 157. The cellular video transmissions are recorded in at least one database 158 of the VIDGO network server 157 for future replay and further processing. The video transmissions are processed in the VIDGO network server 157 to send live streaming videos through an internet signal transmitter 160 and internet signal 162 through commercial communications networks. A VIDGO live video streaming game broadcast 172 can be seen on a plurality of digital devices using a subscribed viewer digital device with the VIDGO app installed 170.

The subscribed viewer can watch all four cameras VIDGO live video streaming game broadcast 172 simultaneously with a split screen feature of the VIDGO app 180 and select one screen for a single view of a camera view that shows the current action on the field. In addition to game action footage half-time interviews with coaches and players can be captured and live streamed. The VIDGO app 180 footage is recorded on at least one database 158 of the VIDGO network server 157 for playback, replays including a slow motion setting feature of the VIDGO app 180. Parents of the youth athletes who attend the games for example boosters can use their personal digital device with the VIDGO app installed 170 to capture footage that can then be shared with other VIDGO subscribers including collegiate scouts of one embodiment.

DETAILED DESCRIPTION

Figure 2:
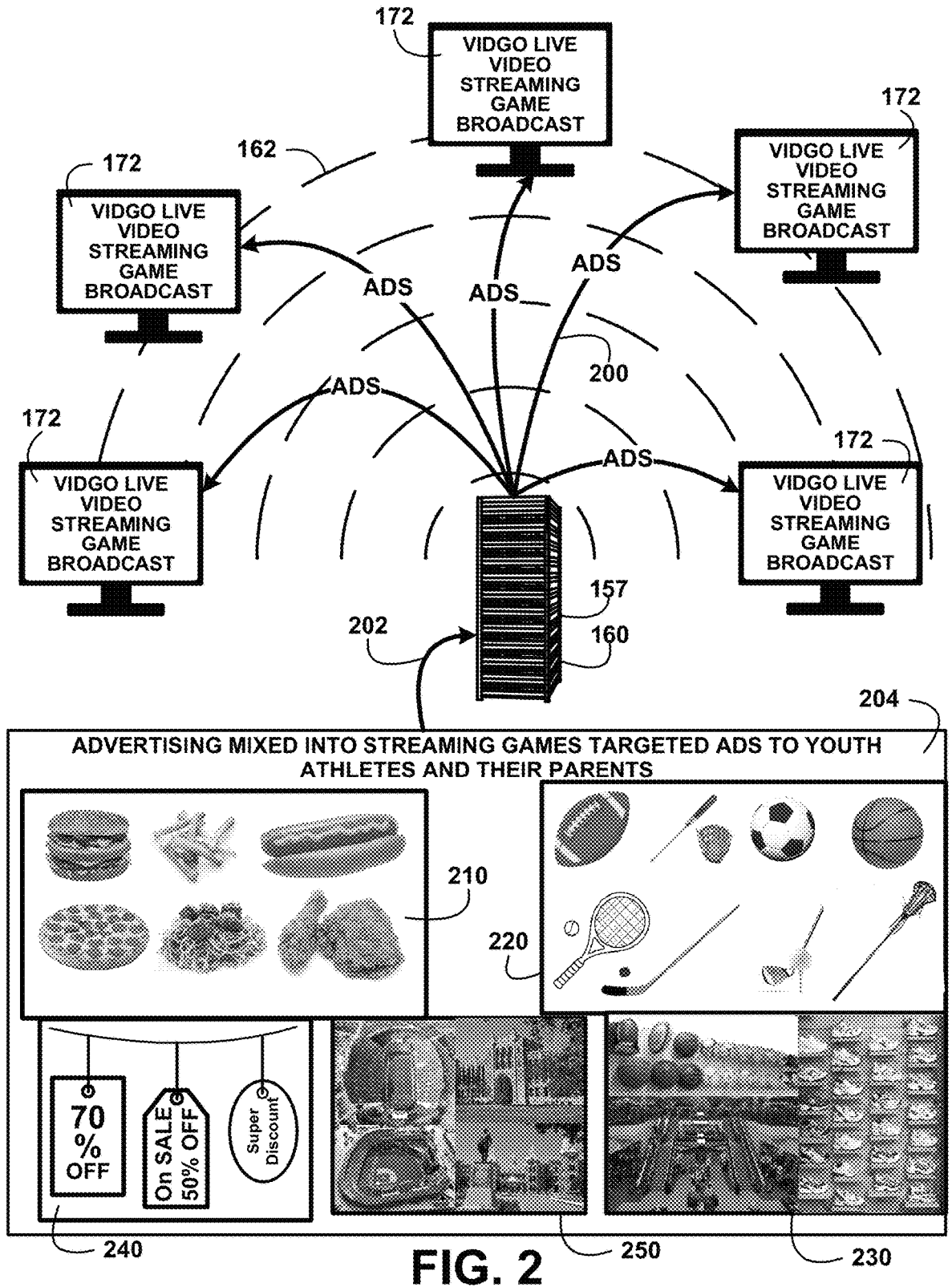
FIG. 2 shows for illustrative purposes only an example of retail advertising mixed into streaming of one embodiment.

FIG. 2 shows for illustrative purposes only an example of retail advertising mixed into streaming of one embodiment. FIG. 2 shows the four camera transmissions being transmitted by the internet signal transmitter 160 of the VIDGO network server 157 broadcasting from the VIDGO network server internet signal 162. The VIDGO live video streaming game broadcast 172 can be viewed on a plurality of subscriber digital devices with the VIDGO application installed 170. The VIDGO network server 157 can insert 202 into the VIDGO live-streaming broadcast ad signals 200 including retail advertising mixed into streaming games targeted ads to youth athletes and their parents 204. The retail advertising can include food service advertisers 210, sports equipment advertisers 220, sporting goods store advertisers 230, sale advertisers 240 and professional and collegiate sports merchandise advertisers 250 of one embodiment.

Figure 3:
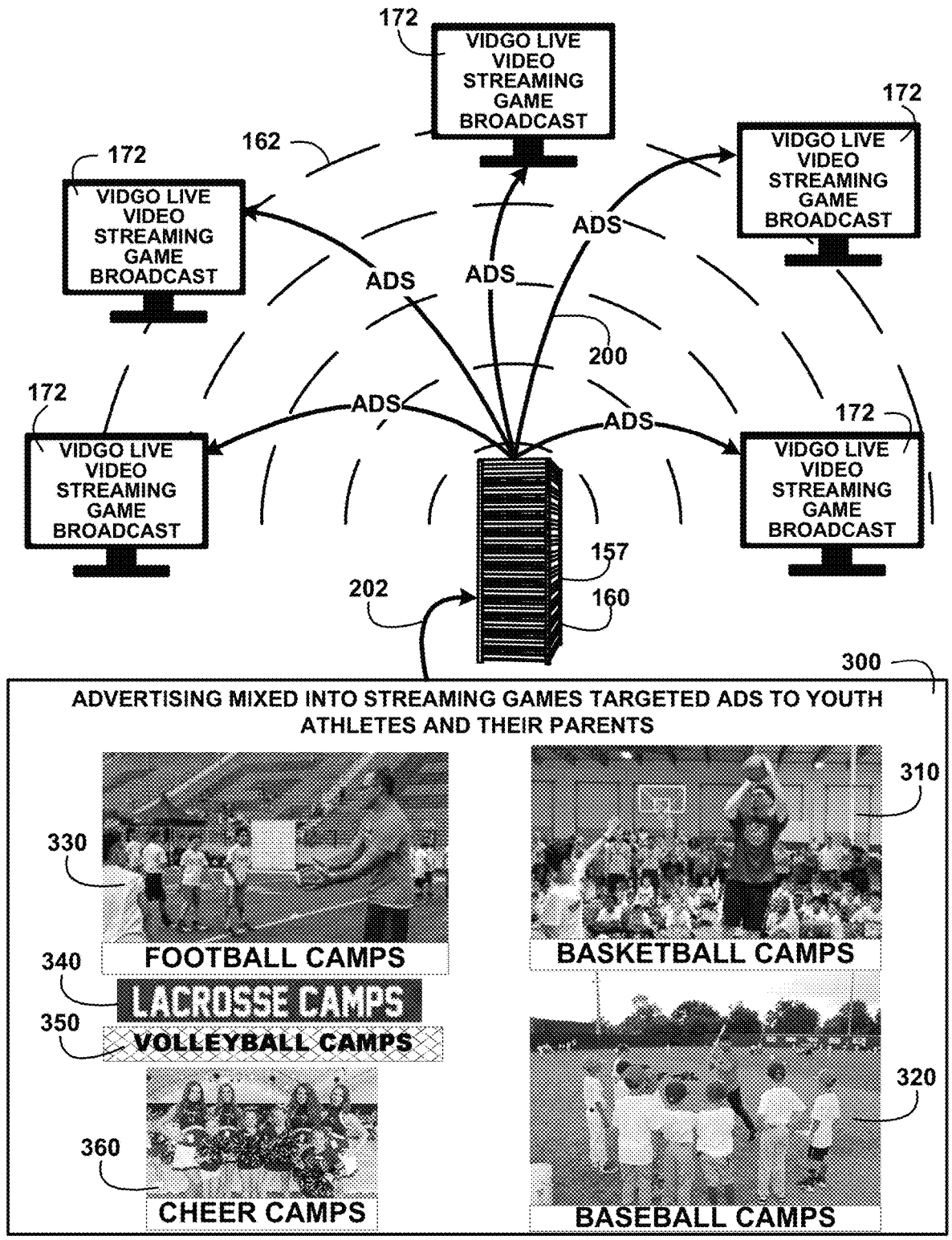
FIG. 3 shows for illustrative purposes only an example of training advertising mixed into streaming of one embodiment.

Training Advertising Mixed into Streaming:

FIG. 3 shows for illustrative purposes only an example of training advertising mixed into streaming of one embodiment. FIG. 3 shows the four camera transmissions received by the VIDGO network server 157 being broadcast using the internet signal transmitter 160 for transmitting the VIDGO network server internet signal 162. The VIDGO network server internet signal 162 creates the VIDGO live video streaming game broadcast 172 on a plurality of a subscriber digital devices with VIDGO application installed. The VIDGO network server 157 can insert 202 into the live-streaming broadcast ad signals 200 including training advertising mixed into streaming games targeted ads to youth athletes and their parents 300 including basketball camps 310, baseball camps 320, football camps 330, lacrosse camps 340, volleyball camps 350, and cheer camps 360 of one embodiment.

Figure 4:
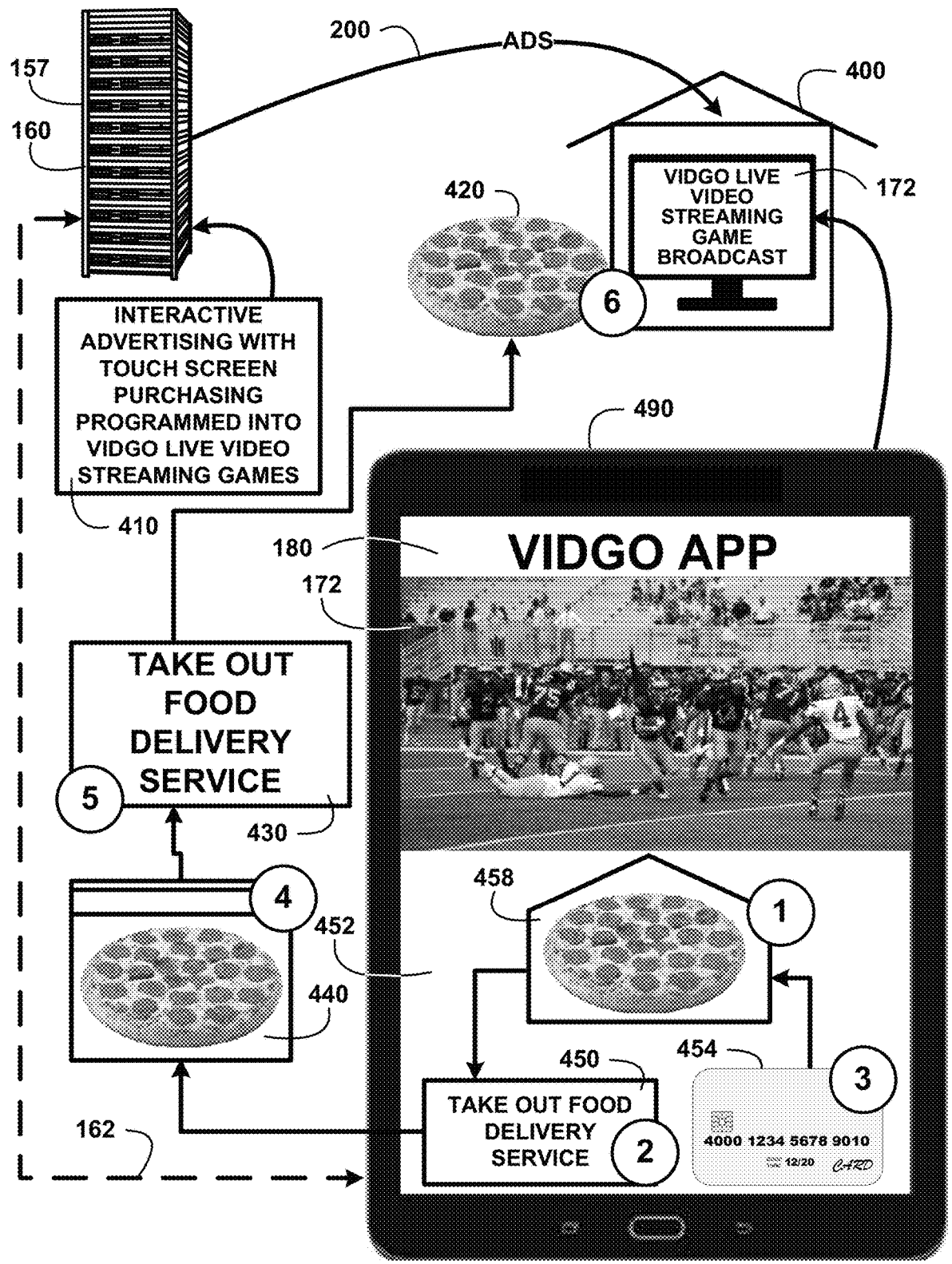
FIG. 4 shows for illustrative purposes only an example of interactive advertising with touch screen purchasing of one embodiment.

Interactive Advertising with Touch Screen Purchasing:

FIG. 4 shows for illustrative purposes only an example of interactive advertising with touch screen purchasing of one embodiment. FIG. 4 shows the internet signal transmitter 160 transmitting ad signals 200 from the VIDGO network server 157. The VIDGO network server internet signal 162 is transmitted to the subscribed viewer digital device with the VIDGO app installed 170 of FIG. 1 for example a tablet 490 with the VIDGO app 180. The ad signals 200 from the VIDGO network server 157 include interactive advertising with touch screen purchasing programmed into VIDGO live video streaming games 410 using the VIDGO application 180. FIG. 4 shows the VIDGO live video streaming game broadcast 172 on a subscriber digital device with VIDGO application installed for example a tablet 490 with the VIDGO app 180.

The internet signal 162 transmits the VIDGO live video streaming game broadcast 172 including a VIDGO application 180 interactive retail online ordering feature 452. During the live video streaming game the ordering process includes Step 1 a subscribed viewer selected retail ad displayed on tablet 458 is in this example a pizzeria. The subscribed viewer places an online order. Step 2 the subscribed viewer selects take-out food delivery service 454. Step 3 the subscribed viewer pays for the order with a bank card 450. The selected take-out food delivery service performs step 4 order picked up at retailer 440. Step 5 the order being delivered by take-out food delivery service 430. Step 6 the subscribed viewer food order delivered 420 to the subscribed viewer home 400. The subscribed viewer can continue to view the VIDGO live video streaming game broadcast 172 using the split screen feature of the VIDGO application of one embodiment.

Figure 5:
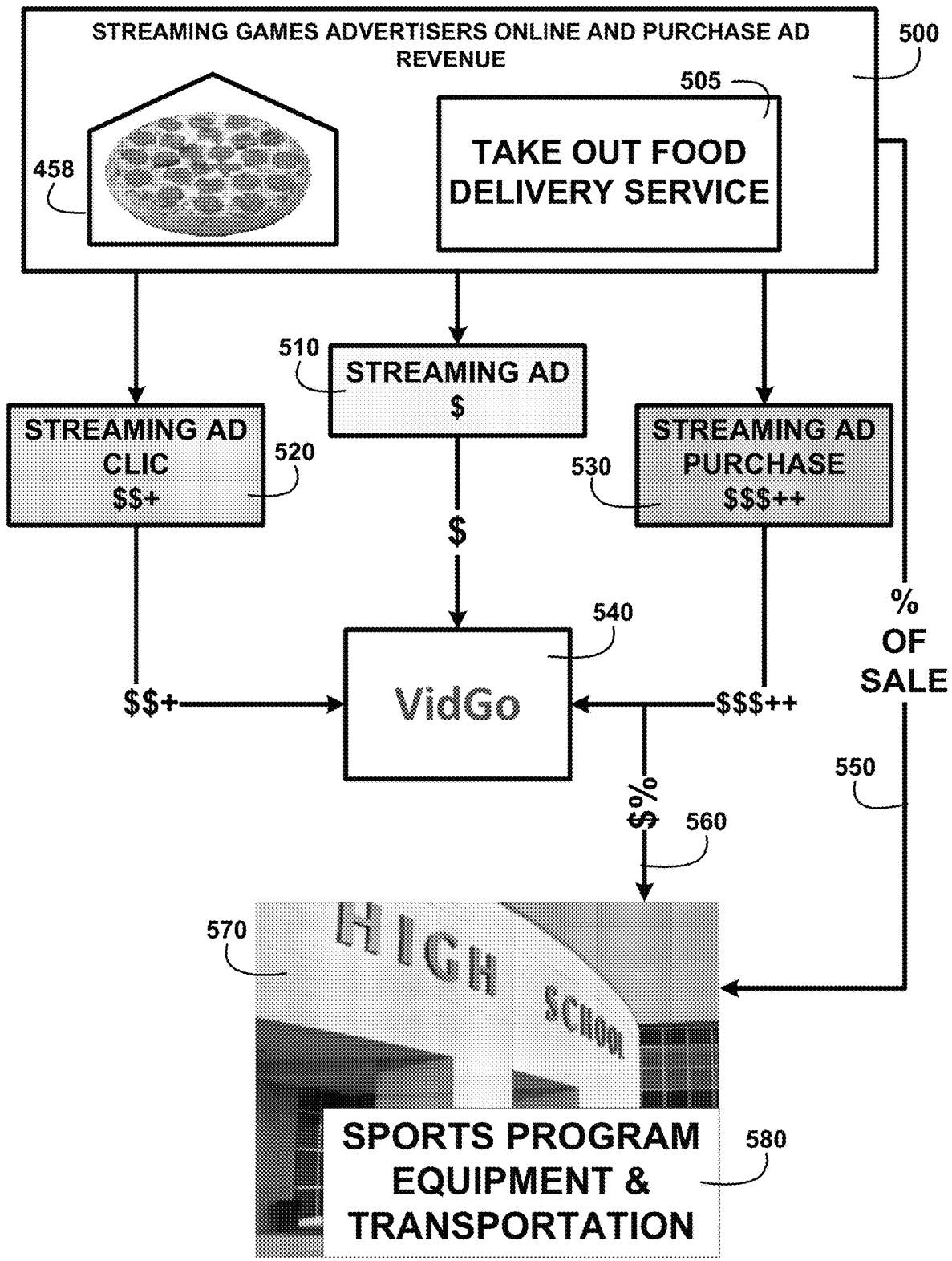
FIG. 5 shows for illustrative purposes only an example of streaming advertiser ad revenue of one embodiment.

Streaming Advertiser Ad Revenue:

FIG. 5 shows for illustrative purposes only an example of streaming advertiser ad revenue of one embodiment. FIG. 5 shows streaming games advertisers online and purchase ad revenue 500 using the example from FIG. 4 shows the food retailer advertiser 450 and shows the take-out food delivery service advertiser 505. Online advertising provides multiple levels of revenue including streaming ad $ revenue 510, streaming ad clic $$+ revenue 520, and streaming ad purchase $$$++ revenue 530. VIDGO can have an agreement with advertisers to donate a % of purchase sales to local high schools and specifically to the two schools shown in the live-streaming broadcast 550. VIDGO receives the advertising revenue 540 and VIDGO can donate %$ of the advertising revenue to the schools showing in the live-streaming broadcast 560. Participating high schools 570 can receive donated revenues to purchase sports program equipment and for transportation expenses to away games 580 of one embodiment.

Figure 6:
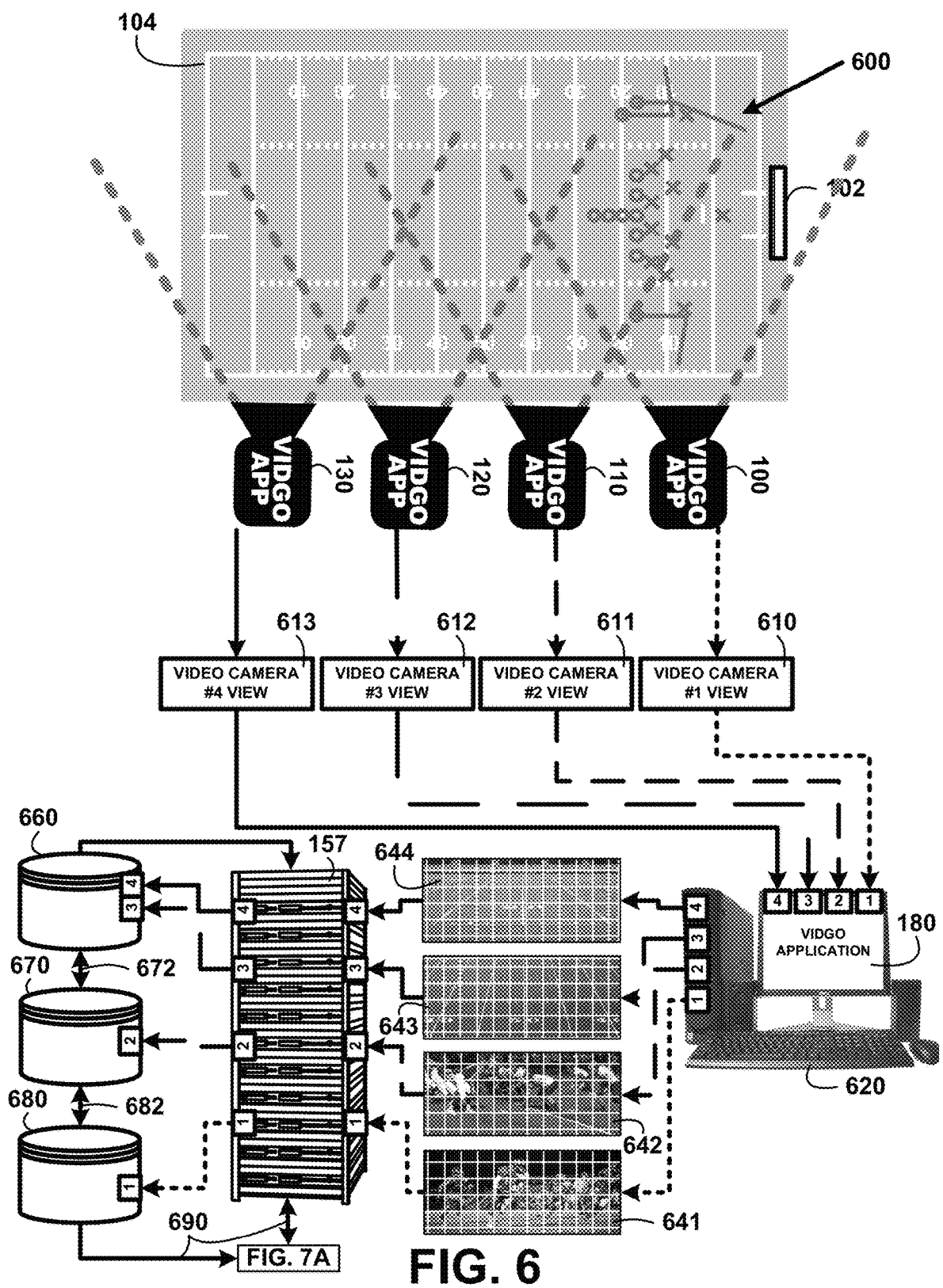
FIG. 6 shows for illustrative purposes only an example of multi-camera live-streaming processing of one embodiment.

Multi-Camera Live-Streaming Processing:

FIG. 6 shows for illustrative purposes only an example of multi-camera live-streaming processing of one embodiment. FIG. 6 shows a sports venue for example a high school football field 104 including the scoreboard 102. Showing in FIG. 6 are two teams on the field shown in playbook format for illustration ease 600. Also shown are the camera #1 with VIDGO app installed 100 video camera #1 view 610, camera #2 with VIDGO app installed 110 video camera #2 view 611, camera #3 with VIDGO app installed 120 video camera #3 view 612, and camera #4 with VIDGO app installed 130 video camera #4 view 613. A cellular transmission from each camera is received by a VIDGO network computer 620 coupled to a VIDGO network server 157.

A VIDGO network computer 620 coupled to a VIDGO network server 157 is used for example in a process where a video camera #1 view is processed in a server digital processor 642 to detect motion on the field and target the football in this example to identify probable action for auto highlight selections of the game 641. Also video camera #2 views are processed in a server digital processor 642, video camera #3 views is processed in a server digital processor 643, and video camera #4 views is processed in a server digital processor 644 using an electronically overlaid coordinate grid to detect motion. A VIDGO network server 157 for example where video camera #1 auto highlight selections are recorded in a first auto highlights database 680.

During an auto highlight selection capture the entire footage of video camera #1 is simultaneously being recorded in a full reel database 682. Video camera #2 auto highlight selections are recorded in a second auto highlights database 670 and during an auto highlight selection capture the entire footage of video camera #2 is simultaneously being recorded in a full reel database 672. No motion is detected in the camera #3 and #4 views and video camera #3 and #4 captured footage is recorded in a full reel database 660. The full reel database entire footage from all four cameras can be retrieved for playbacks. Auto highlight selections are chronologically matched into a single reel during the game from all four cameras and recorded in a game highlights section of the full reel database. Footage recorded is tagged with the ID # of the home team and visitor team, date and other data for ease of queries on playbacks of one embodiment. Additional processing 690 is described in FIG. 7A.

Figure 7A:
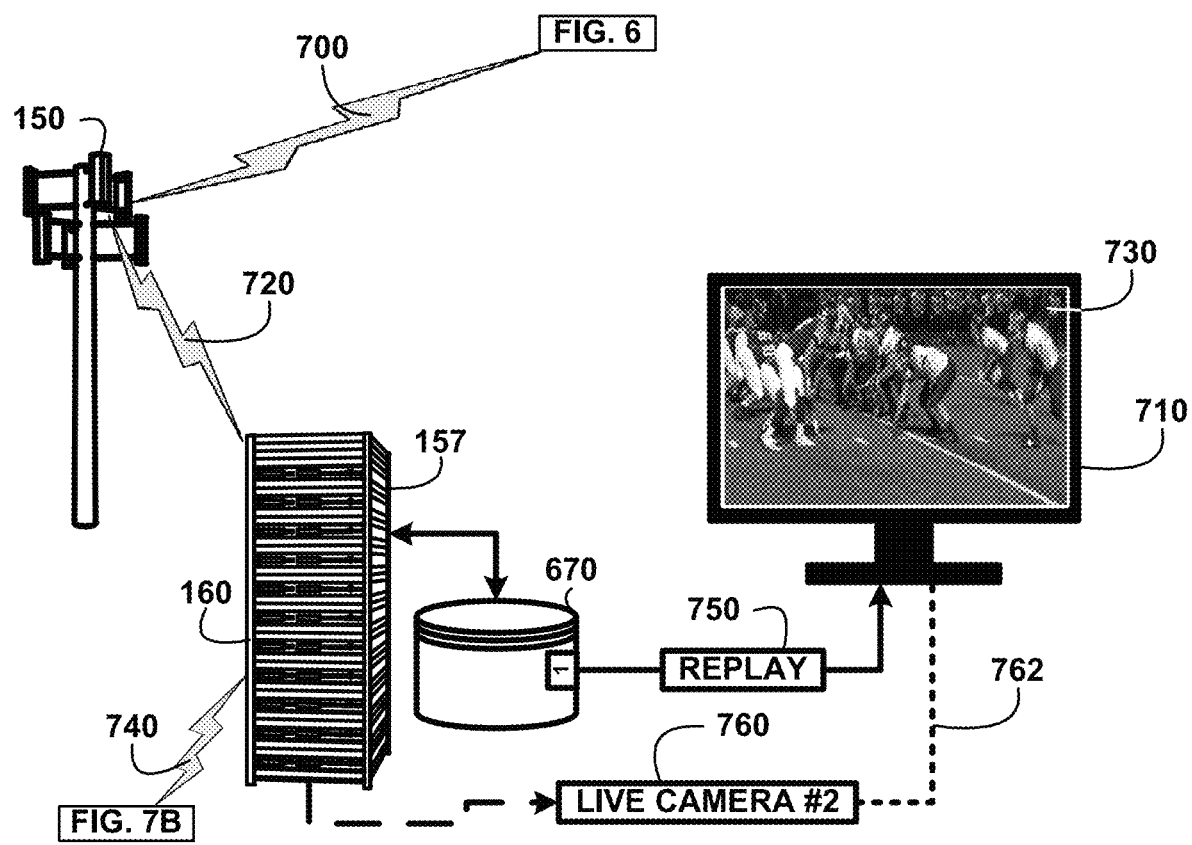
FIG. 7A shows for illustrative purposes only an example of first camera live-streaming auto action prioritizing of one embodiment.

First Camera Live-Streaming Auto Action Prioritizing:

FIG. 7A shows for illustrative purposes only an example of first camera live-streaming auto action prioritizing of one embodiment. A continuation from FIG. 6 includes FIG. 7A shows the cellular tower 150 receiving the live streaming video feed from the VIDGO app cameras. The internet signal transmitter 160 of the VIDGO network server 157 is broadcasting the live streaming feed from live camera #2 760. The game action has stopped for example for an end of play or a time-out called. The subscriber has selected a camera #1 auto highlight selection replay 750. The subscriber replay 750 selection is processed 700. The camera #1 highlight replay 750 can be shown 730 to a subscribed viewer to watch in-between plays on a subscribed viewer digital device 710. The live camera #2 760 broadcast will continue in the background 762 while the replay 750 is showing. The highlighted replay 750 will play for a limited time until play resumes and VIDGO live video streaming game will resume of one embodiment.

Figure 7B:
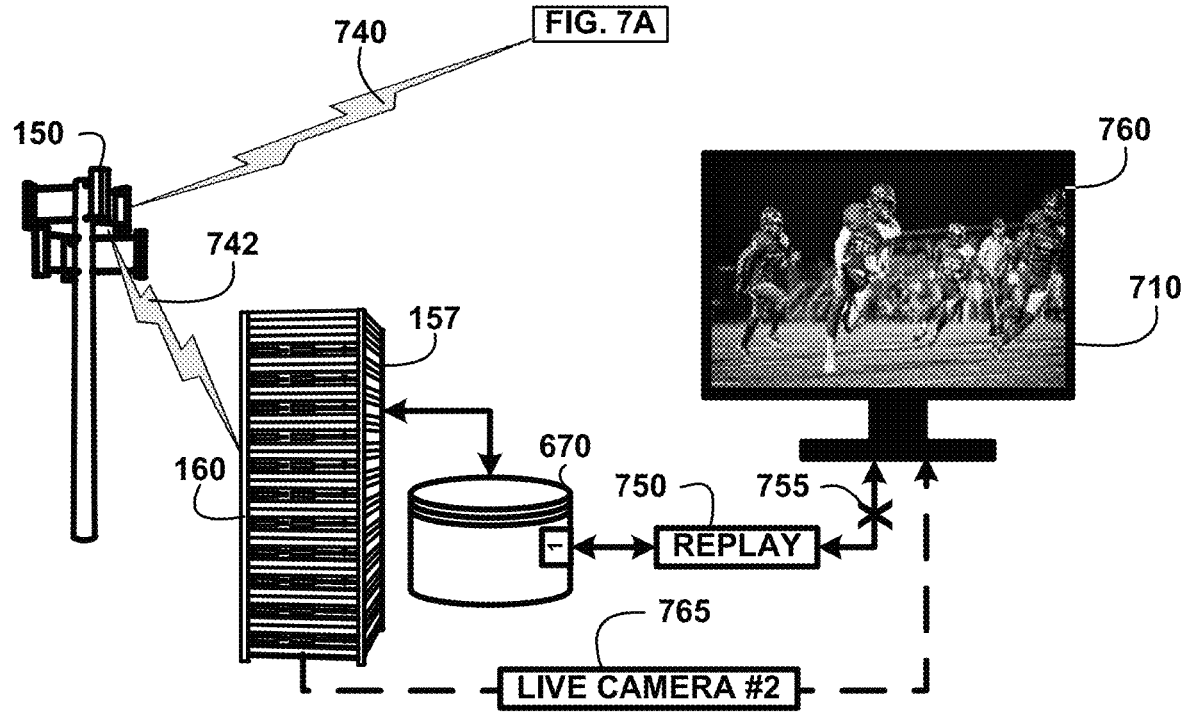
FIG. 7B shows for illustrative purposes only an example of second camera live-streaming auto action prioritizing of one embodiment.

Second Camera Live-Streaming Auto Action Prioritizing:

FIG. 7B shows for illustrative purposes only an example of second camera live-streaming auto action prioritizing of one embodiment. FIG. 7B shows the cellular tower 150 receiving the live streaming video feed from the VIDGO app cameras. The VIDGO network server 157 has determined that play is about to resume based on the formation of lining up along the scrimmage line of the players has begun. The internet signal transmitter 160 of the VIDGO network server 157 continues broadcasting the live video streaming feed from camera #2 765 and the broadcast of the VIDGO camera #1 highlight replay 750 is interrupted 755 and the live camera #2 broadcast is displayed 760 on the subscribed viewer digital device 710. The camera #1 auto highlight selection replay 750 can be requested by a subscribed viewer to watch in-between plays at any time of one embodiment.

Figure 8:
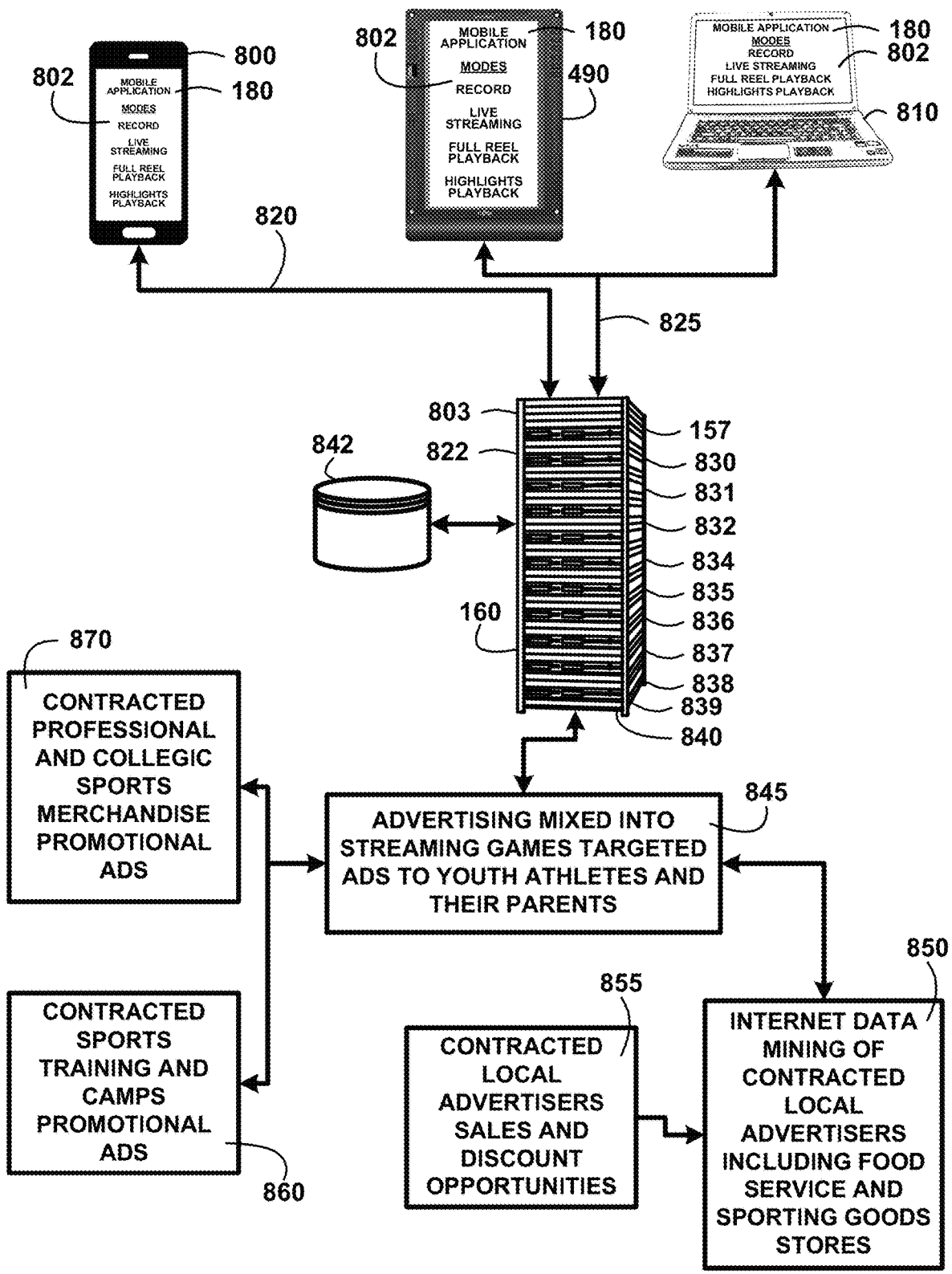
FIG. 8 shows for illustrative purposes only an example of ad mixing into streaming of one embodiment.

Ad Mixing into Streaming:

FIG. 8 shows for illustrative purposes only an example of ad mixing into streaming of one embodiment. FIG. 8 shows subscribed viewer digital devices including a smart phone 800, the tablet 490, a computer and a laptop computer 810 with the mobile application 180 installed. The mobile application 180 displays a modes selection menu 802 including record, live-streaming, full reel playback and highlights playback. The modes selection menu 802 is displayed on a home page from a VIDGO website 803 on the VIDGO network server 157.

The mobile application 180 connects to the VIDGO network server 157. The VIDGO network server 157 is coupled to at least one digital database 830, at least one digital processor 831, at least one OCR device 832, at least one WI-FI connectable device 833, at least one printer 834, at least one video device 835, at least one cellular connectable device 836, at least one data mining device 837, at least one internet connectable device 838, at least one internet signal transmitter 160, at least one OCR device 839, at least one digital memory device 840, at least one advertising database 842, and a sports equipment recognition tracking device 822.

The sports equipment recognition tracking device 822 includes a database of various sports equipment for example a football, baseball, tennis ball, hockey puck, baseball bat, hockey stick, tennis racquet and other pieces of sports equipment including the standard dimensions and shapes and colors. The sports equipment recognition tracking device 822 scans the video images being captured to match images of a database example of a particular piece of sports equipment and then tracks it movement on the video captured images.

Advertising mixed into streaming games targeted ads to youth athletes and their parents 845 includes a process for internet data mining of contracted local advertisers including food service and sporting goods stores 850, contracted local advertisers sales and discount opportunities 855, contracted sports training and camps promotional ads 860, and contracted professional and collegiate sports merchandise promotional ads 870 of one embodiment.

Figure 9:
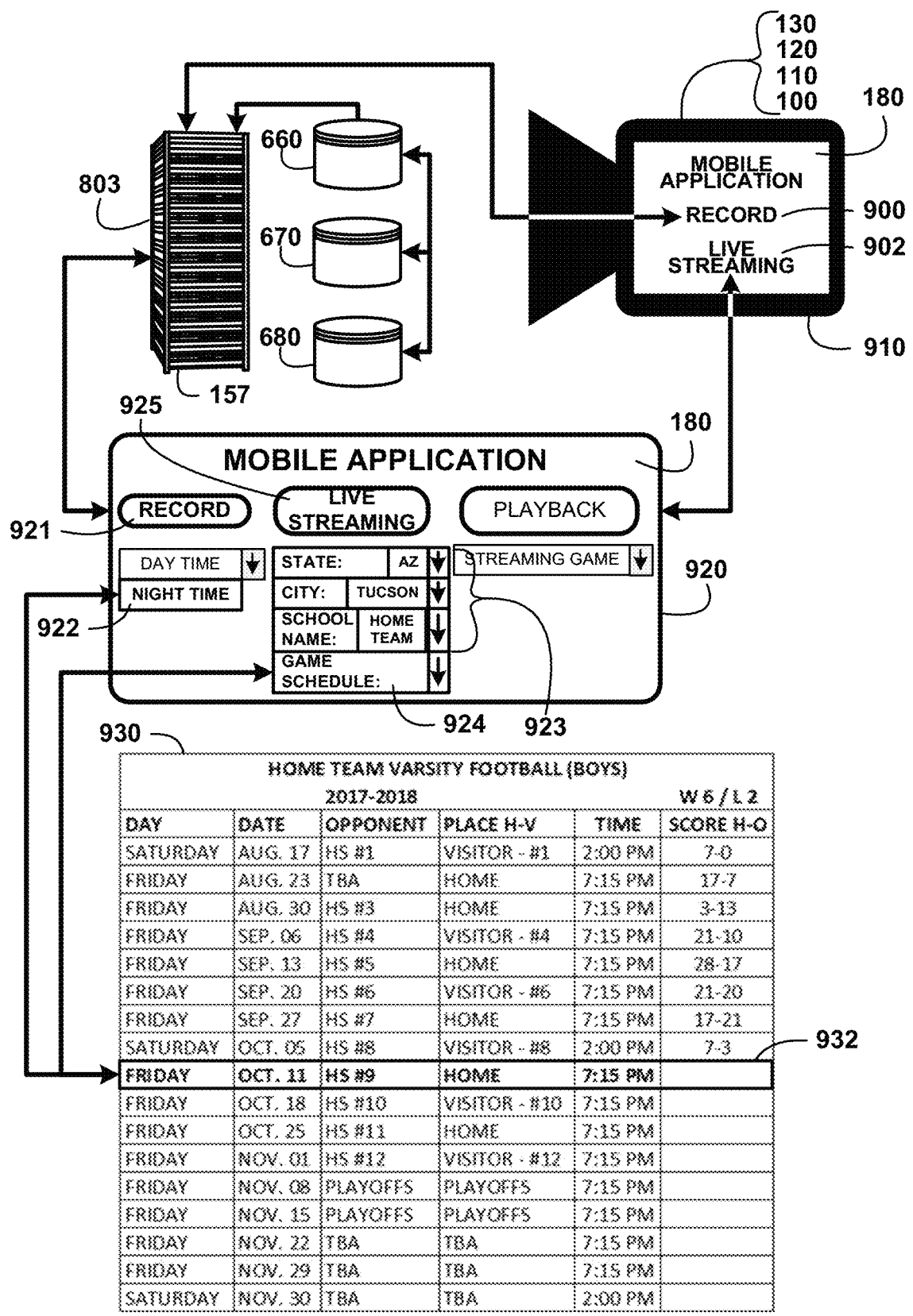
FIG. 9 shows for illustrative purposes only an example of record mode settings of one embodiment.

Record Mode Settings:

FIG. 9 shows for illustrative purposes only an example of record mode settings of one embodiment. FIG. 9 shows the mobile application 180 modes including record, live-streaming, full reel playback and highlights playback are displayed on a home page from a VIDGO website 803 on the VIDGO network server 157. The subscribed viewer can select a record mode 900 and live-streaming mode 902 on a video camera with a VIDGO app 180 installed and cellular connectivity 910. Selecting the record mode 900 and live-streaming mode 902 is the same process for video cameras #1 100, #2 110, #3 120, #4 130.

Each video camera with the record mode selected is connected to the VIDGO network server 157. Video camera recording for example video camera #3 and #4 captured footage is recorded in a full reel database 660, video camera #2 auto highlight selections are recorded in a second auto highlights database 670, and video camera #1 auto highlight selections are recorded in a first auto highlights database 680. A mobile application mode selection menu 920 includes a selection to record 921 where for example a state drop down where AZ has been selected 923, a city drop down where Tucson has been selected and a school name drop down where 'home team" has been selected by the subscribed viewer. An ambient light drop down where night time has been automatically selected based on the time of the game 7:15 pm 922.

A game schedule drop down 924 appears on screen from one of the at least databases where data mining of the names of high schools in Tucson, Ariz. and their game schedules have been recorded. The mobile application 180 shows the home team season game schedule that was gathered from a data mining device process and OCR processed to create digitally readable data 930. A camera operator selects the game to be live streamed from the game schedule 932. At least one digital processor 831 has entered the scores from the previous games and calculated the win loss totals showing as W6/L2. The OCR device converts an image captured of a final game scoreboard data into readable text which includes the home and visitor scores for recording and processing on the VIDGO network server 157.

The mobile application 180 turns a subscribed viewer handheld device into a live switching TV studio for multi-cam coverage of any event. The mobile application 180 brings multi-camera programming of live sports to the handheld devices many people own. The mobile application 180 allows multiple devices to record and control a subscribed viewer device to switch video feeds for live broadcasting and the recorded live broadcast feed can be watched later on any device with the mobile application 180 of one embodiment.

Figure 10:
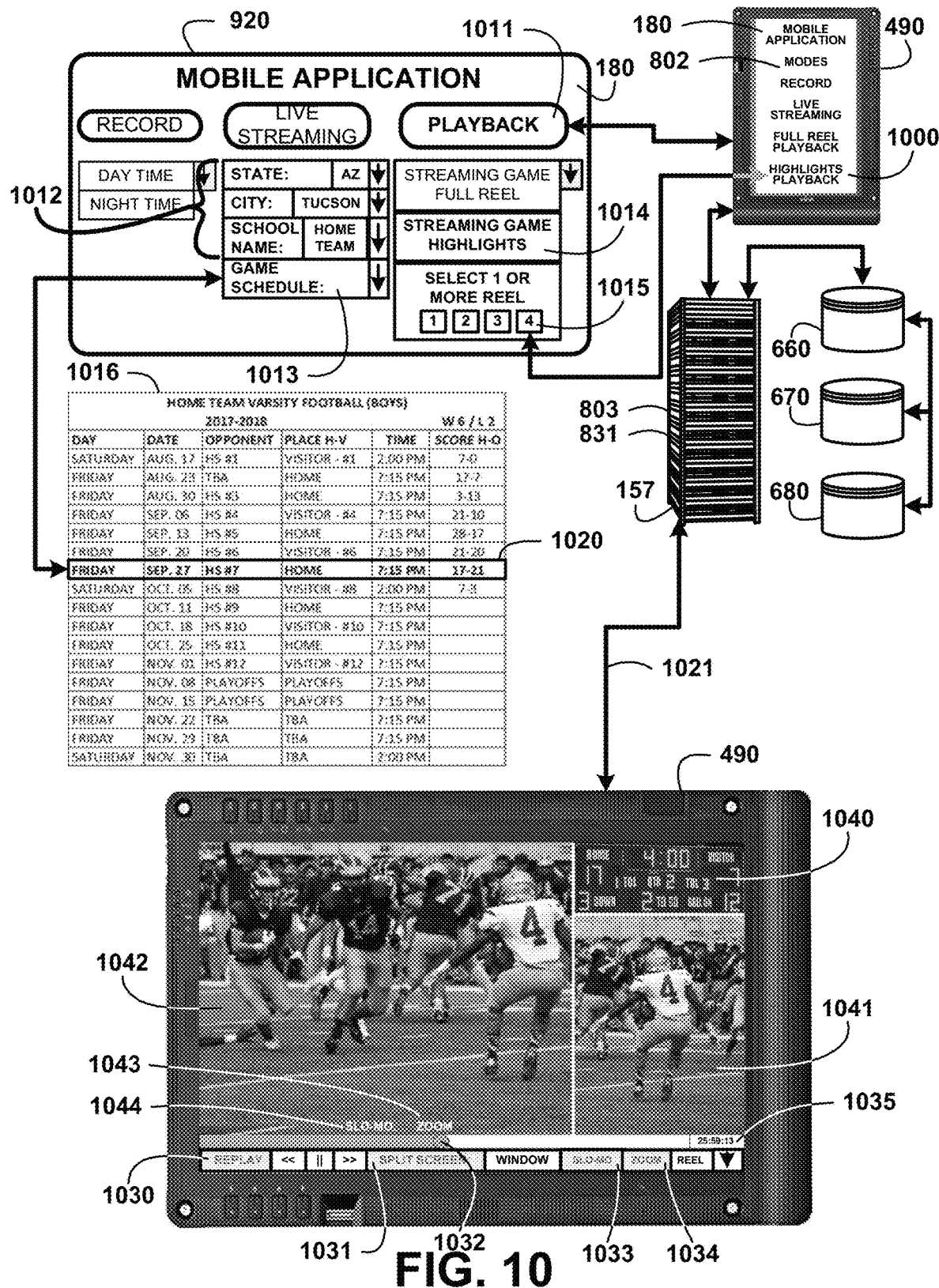
FIG. 10 shows for illustrative purposes only an example of highlights playback settings of one embodiment.

Highlights Playback Settings:

FIG. 10 shows for illustrative purposes only an example of highlights playback settings of one embodiment. FIG. 10 shows a subscribed viewer tablet 490 with the mobile application 180 modes including record, live-streaming, full reel playback and highlights playback are displayed on a home page from a VIDGO website 803 on the VIDGO network server 157. The subscribed viewer can select highlights playback 1000 from the mobile application mode selection menu 920 in a playback 1011 mode. A subscribed viewer selects the state, city and school for playback 1012. The game schedule drop down shows the "home team" season game schedule 1013.

A subscribed viewer selects a game in which the home team lost 1020 from the home team season game schedule 1016. A selection of streaming game highlights is made 1014 along with a selection of camera #4 highlights is made 1015. The subscribed viewers' selections are transmitted to the VIDGO network server 157. The VIDGO network server 157 downloads the selections where video camera #3 and #4 captured footage is recorded in a full reel database 660, video camera #2 auto highlight selections are recorded in a second auto highlights database 670, and video camera #1 auto highlight selections are recorded in a first auto highlights database 680.

The camera #4 highlights are transmitted to the viewers' digital device 1021 in this example a tablet 490. On the tablet 490 the subscribed viewer selects replay 1030, split screen 1031, slo-mo 1033 and zoom 1034. The playback 1011 mode displays a footage camera #4 footage timer 1032 and a scoreboard 1040 with game time elapsed 1035 in this example for the second quarter. The playback 1011 mode displays in the split screen 1031 mode the scoreboard 1040, unzoomed footage 1041, and a replay of auto highlight selection 1042. The replay of auto highlight selection 1042 screen shows replay slo-mo mode is displayed 1043 and replay zoom mode is displayed 1044 to alert the subscribed viewer those modes are selected. The subscribed viewer can unselect and reselect the modes at any time of one embodiment.

Figure 11:
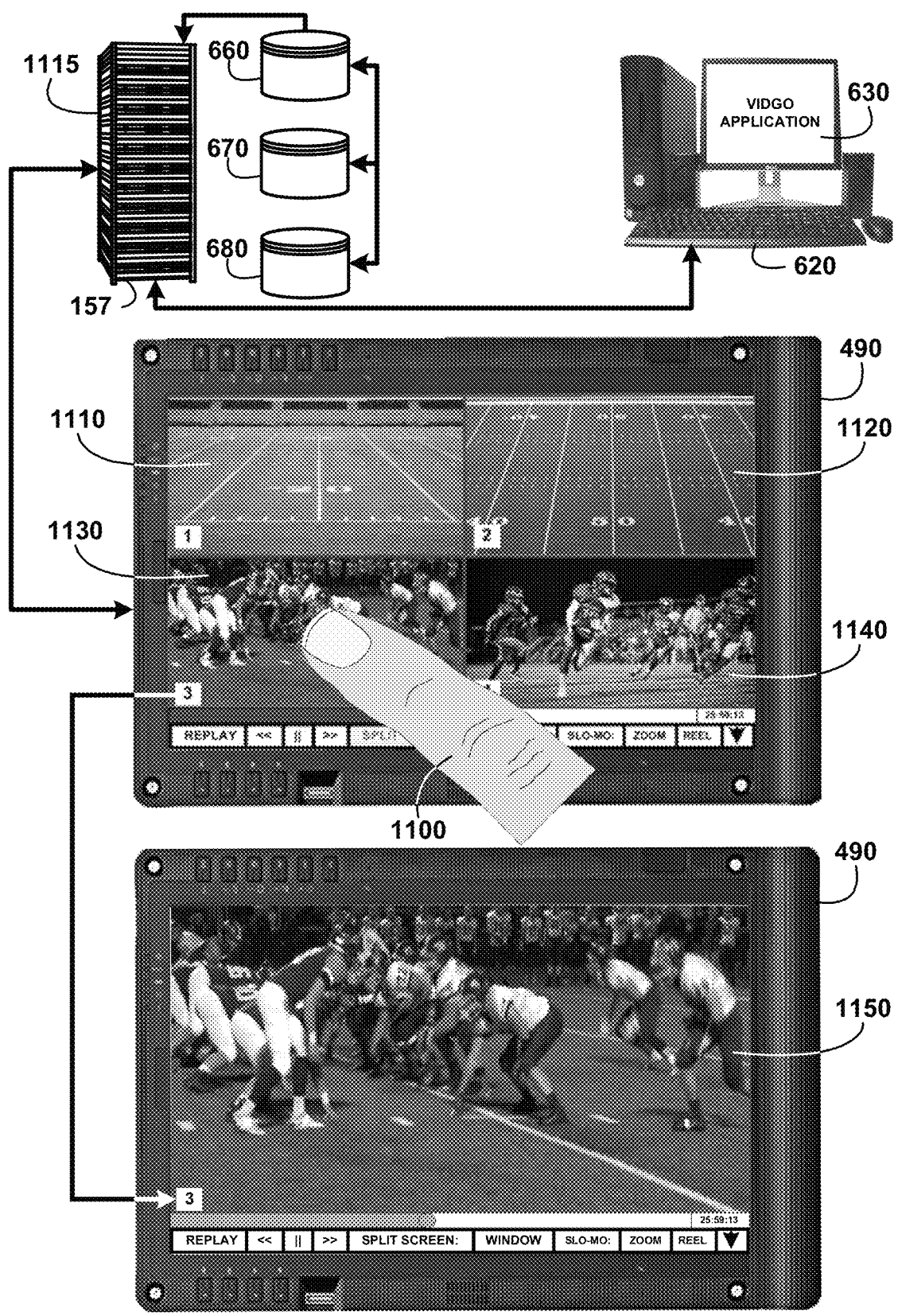
FIG. 11 shows for illustrative purposes only an example of split screen mode selection of one embodiment.

Split Screen Mode Selection:

FIG. 11 shows for illustrative purposes only an example of split screen mode selection of one embodiment. FIG. 11 shows a cellular transmission from each camera is received by a VIDGO network computer 620 coupled to the VIDGO network server 157 including a video recognition device 1115. The VIDGO network computer 620 coupled to a VIDGO network server 157 receives from the VIDGO network server 157 video camera #3 and #4 captured footage is recorded in a full reel database 660, video camera #2 auto highlight selections are recorded in a second auto highlights database 670 and video camera #1 auto highlight selections are recorded in a first auto highlights database 680. The footage is shown on a subscribed viewers' tablet 490 including camera #1 live-streaming video 1110, camera #2 live-streaming video 1120, camera #3 live-streaming video 1130, and camera #4 live-streaming video 1140. The default live-streaming view is a split screen showing all four cameras views. A subscribed viewer taps the camera #3 view 1100 as cameras #1 and #2 are showing no action. The camera #3 view is enlarged to fill the screen as the subscribed viewer selected 1150 to better see the action showing in the camera #3 views. The subscribed viewer can tap both camera #3 and camera #4 and see a split view of both views simultaneously of one embodiment.

Figure 12A:
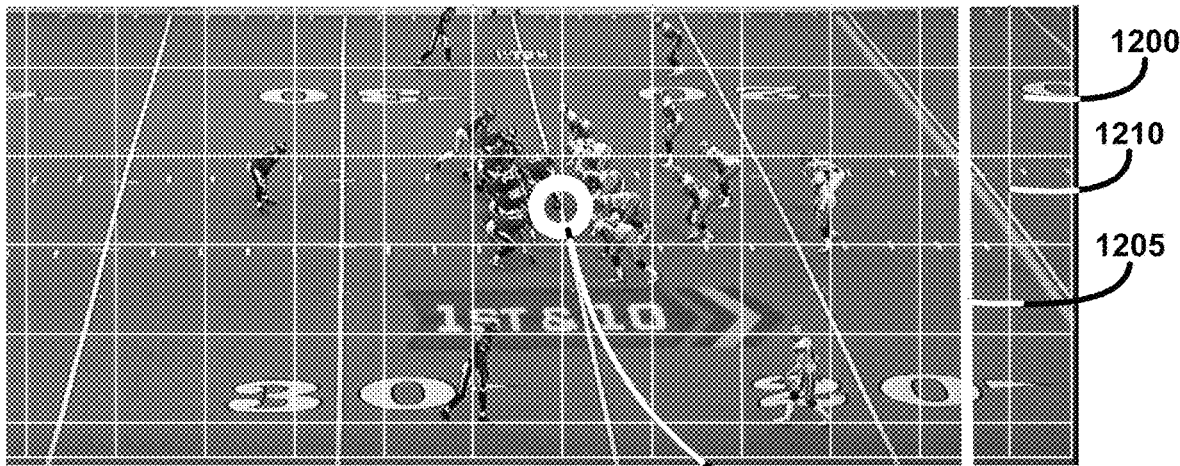
FIG. 12A shows for illustrative purposes only an example of auto cross camera first view action targeting of one embodiment.

Auto Cross Camera First View Action Targeting:

FIG. 12A shows for illustrative purposes only an example of auto cross camera first view action targeting of one embodiment. FIG. 12A shows where a camera #2 view is displayed with a matching overlay of a camera #1 view 1200. An electronic grid 1210 is superimposed by the VIDGO network server 157 of FIG. 1 which is not visible to the subscribed viewer. The electronic grid 1210 is used to track motion and speed of the action. The at least one digital processor 831 of FIG. 8 calculates motion by images passing through the grid. The electronic grid 1210 also provides a relative speed reference for calculating the relative speed of persons and objects on the field. The at least one video device 835 of FIG. 8 includes a video recognition device 1115 of FIG. 11.

One of the at least one digital database 830 of FIG. 8 includes data on basic sports equipment including footballs, baseballs, tennis balls, hockey pucks and others. These pieces of sports equipment are generally the focus of the action. The sizes, shapes and in some cases materials of these pieces of sports equipment are controlled by league, conference and international standards.

The video recognition device 1115 of FIG. 11 can download the size, shape and at least typical material color of the piece of sports equipment corresponding to the sports game being captured. The video recognition device 1115 of FIG. 11 can scan the views being received from the cameras and identify and locate the object matching the piece of sports equipment corresponding to the standard size, shape and color. The video recognition device 1115 of FIG. 11 can track the location of the for example baseball.

The video recognition device 1115 of FIG. 11 can track the movement of the baseball across the electronic grid 1210 and using the at least one digital processor 831 of FIG. 8 can calculate a projected path of the baseball. The distance the baseball is from the camera capturing its image can be calculated by the at least one digital processor 831 of FIG. 8 in a calculated range finder calculation by evaluating the size of the baseball image versus the standardized size. This calculated range finder value can be used to calculate a zooming setting to capture a closer view of the action surrounding the location of the baseball.

For example a baseball hit towards an outfield fence will appear to become visibly smaller. Activating the zoom mode using the calculated zooming setting can bring into better view an outfielders' attempt at catching the potential home run baseball. The projected path of the baseball allows for loss of visibility of the actual baseball and allows highlights selections to focus on the projected path until the baseball comes into visibility and can be identified by the video recognition device 1115 of FIG. 11 at which time a recalculated projected path can be determined.

In the football example the football recognition locates the position of the football on the line of scrimmage 1220. The VIDGO network server 157, at least one digital processor 831 of FIG. 8, at least one video device 835 of FIG. 8 and at least one OCR device 832 of FIG. 8 are used to identify matching points on the adjacent camera views. In this example the at least one OCR device 832 of FIG. 8 converts the 20 yard line into readable data on both the camera #2 and #1 view. The at least one video device 835 of FIG. 8 matches the identified 20 yard line images in an overlay. The at least one digital processor 831 of FIG. 8 calculates the electronic grid 1210 spacing to account for any approximations of the matched images. FIG. 12A shows the matching overlay line of camera #2 and camera #1 1205 and overlaid electronic grid 1210 of one embodiment.

Figure 12B:
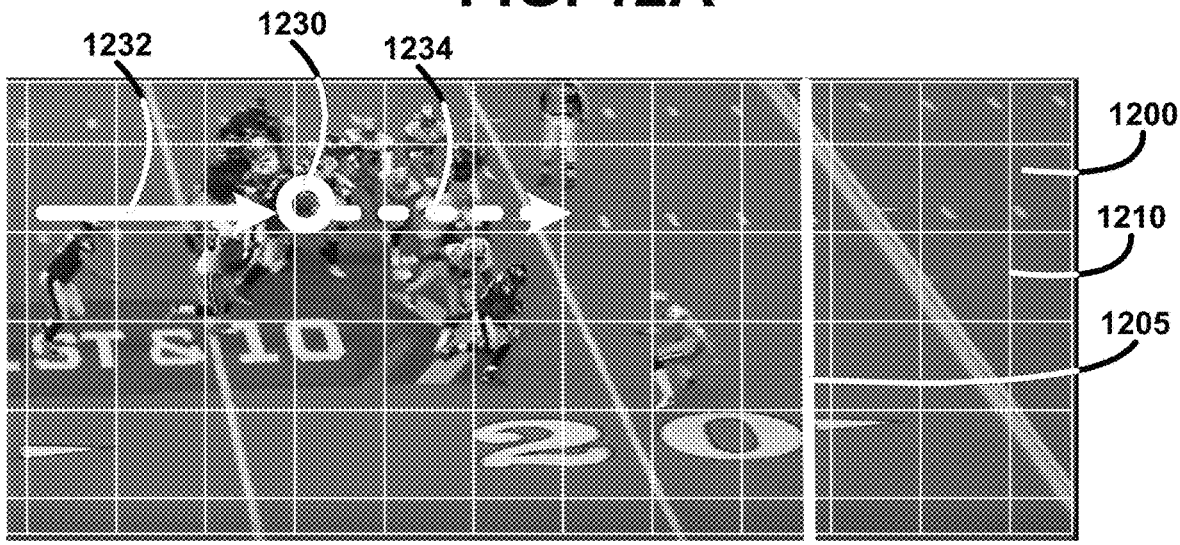
FIG. 12B shows for illustrative purposes only an example of auto cross camera second view action targeting of one embodiment.

Auto Cross Camera Second View Action Targeting:

FIG. 12B shows for illustrative purposes only an example of auto cross camera second view action targeting of one embodiment. FIG. 12B shows the camera #2 view is displayed with a matching overlay of a camera #1 view 1200 including the electronic grid 1210 and matching overlay line of camera #2 and camera #1 1205. The sports equipment recognition tracking device 822 of FIG. 8 has located the football 1230 at a newly calculated terminus of the previous path of the runner with the football 1232. The at least one digital processor 831 of FIG. 8 calculates a recalculated projected path and speed of the runner and football for auto highlight selection tracking 1234 of one embodiment.

Figure 12C:
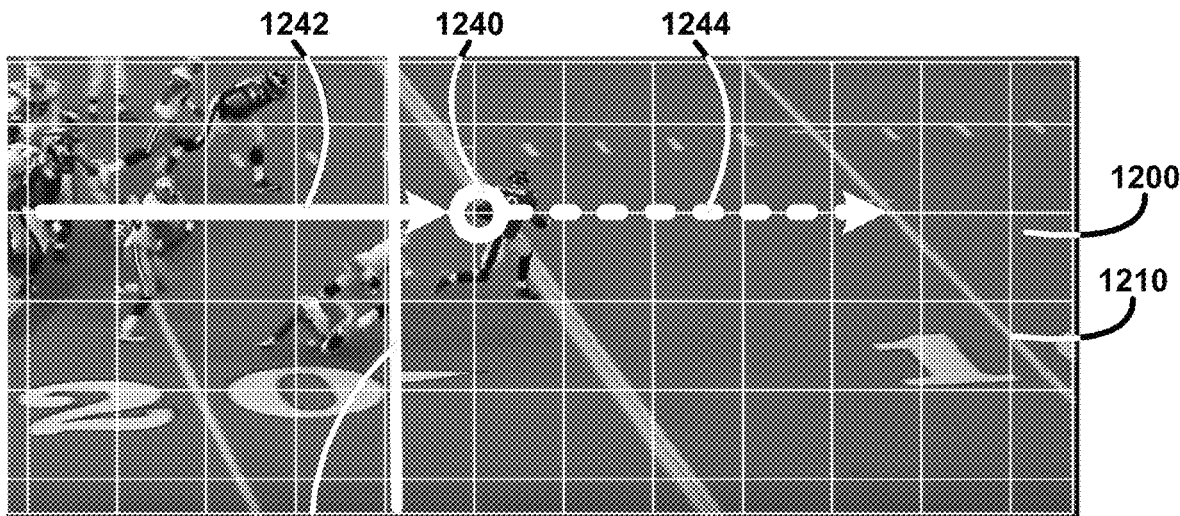
FIG. 12C shows for illustrative purposes only an example of auto cross camera third view action targeting of one embodiment.

Auto Cross Camera Third View Action Targeting:

FIG. 12C shows for illustrative purposes only an example of auto cross camera third view action targeting of one embodiment. FIG. 12C shows a camera #2 view is displayed with a matching overlay of a camera #1 view 1200, the electronic grid 1210 and matching overlay line of camera #2 and camera #1 1205. The sports equipment recognition tracking device 822 of FIG. 8 has located the football carried by the runner 1240 at the terminus of the previous path of the runner with the football 1242. The at least one digital processor 831 of FIG. 8 calculates a projected path and speed of the runner and football for auto highlight selection tracking across the matching overlay line of camera #2 and camera #1 1244 of one embodiment.

Figure 13:
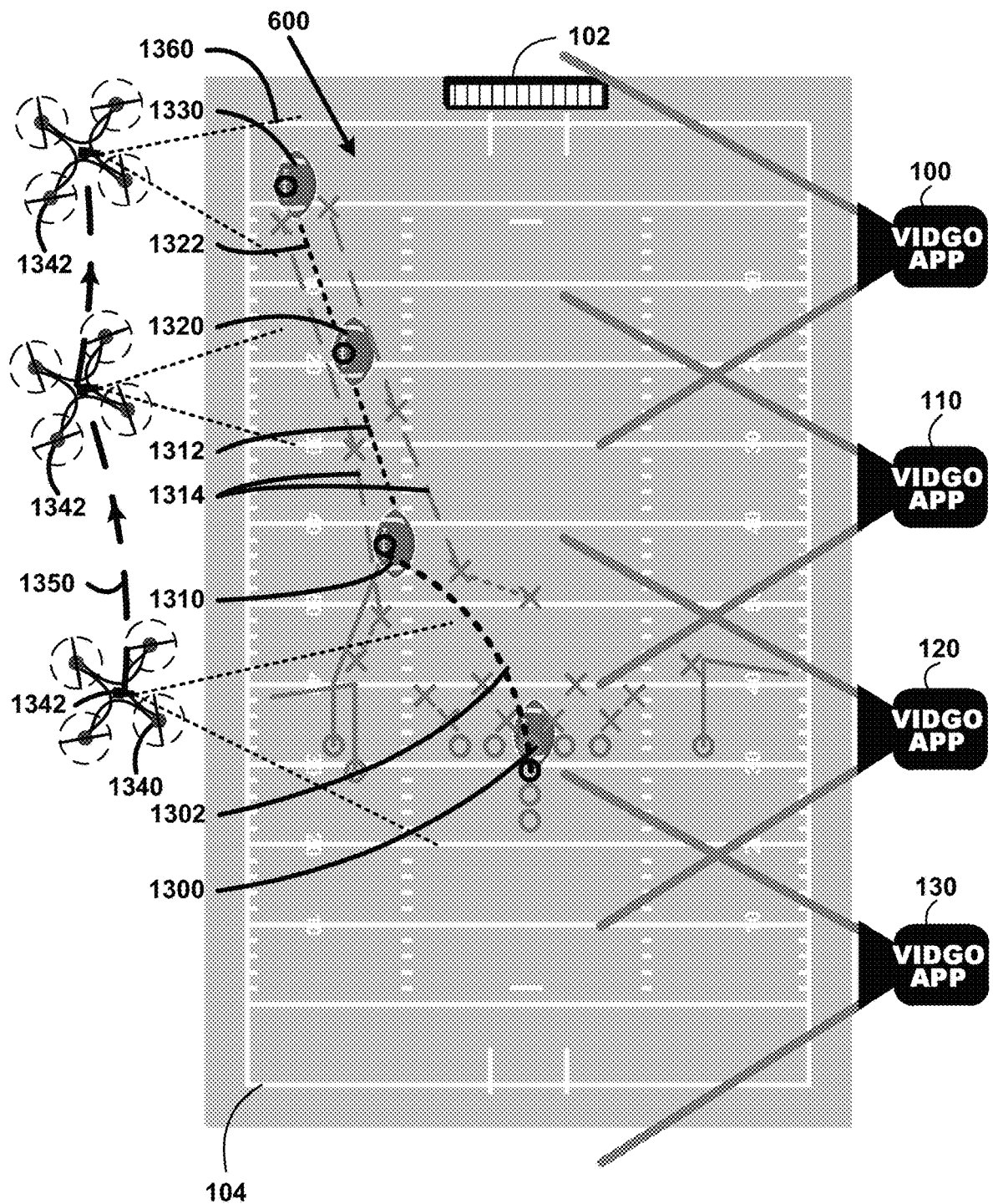
FIG. 13 shows for illustrative purposes only an example of auto drone camera streaming tracking of one embodiment.

Auto Drone Camera Streaming Tracking:

FIG. 13 shows for illustrative purposes only an example of auto drone camera streaming tracking of one embodiment. FIG. 13 shows the sports venue for example a high school football field 104, scoreboard 102, camera #1 with VIDGO app installed 100, camera #2 with VIDGO app installed 110, camera #3 with VIDGO app installed 120, camera #4 with VIDGO app installed 130, and two teams on the field shown in playbook format for illustration ease 600.

In one embodiment a drone 1342 with a video camera with the VIDGO app installed is deployed during the game 1340. The drone 1342 camera image allows the sports equipment recognition tracking device 822 of FIG. 8 to locate the football on the line of scrimmage 1300. A quarterback passes the football 1302 to a receiver down field catches the football 1310. The receiver runs towards the corner of the end zone 1312 and two defenders run after the receiver 1314.

The drone 1342 receives the projected path and speed from the VIDGO network server 157 of FIG. 1 and flies the projected path 1350. The sports equipment recognition tracking device 822 of FIG. 8 locates the football being carried by the receiver 1320. The receiver runs approximately following the projected path 1322 and the receiver crosses the goal line 1330. The drone 1342 camera captures the touchdown from an aerial view 1360. The VIDGO network server 157 of FIG. 1 at least one digital processor 831 of FIG. 8 has detected the motion on the field and has added the drone 1342 aerial coverage to the auto highlight selection of one embodiment.

Figure 14:
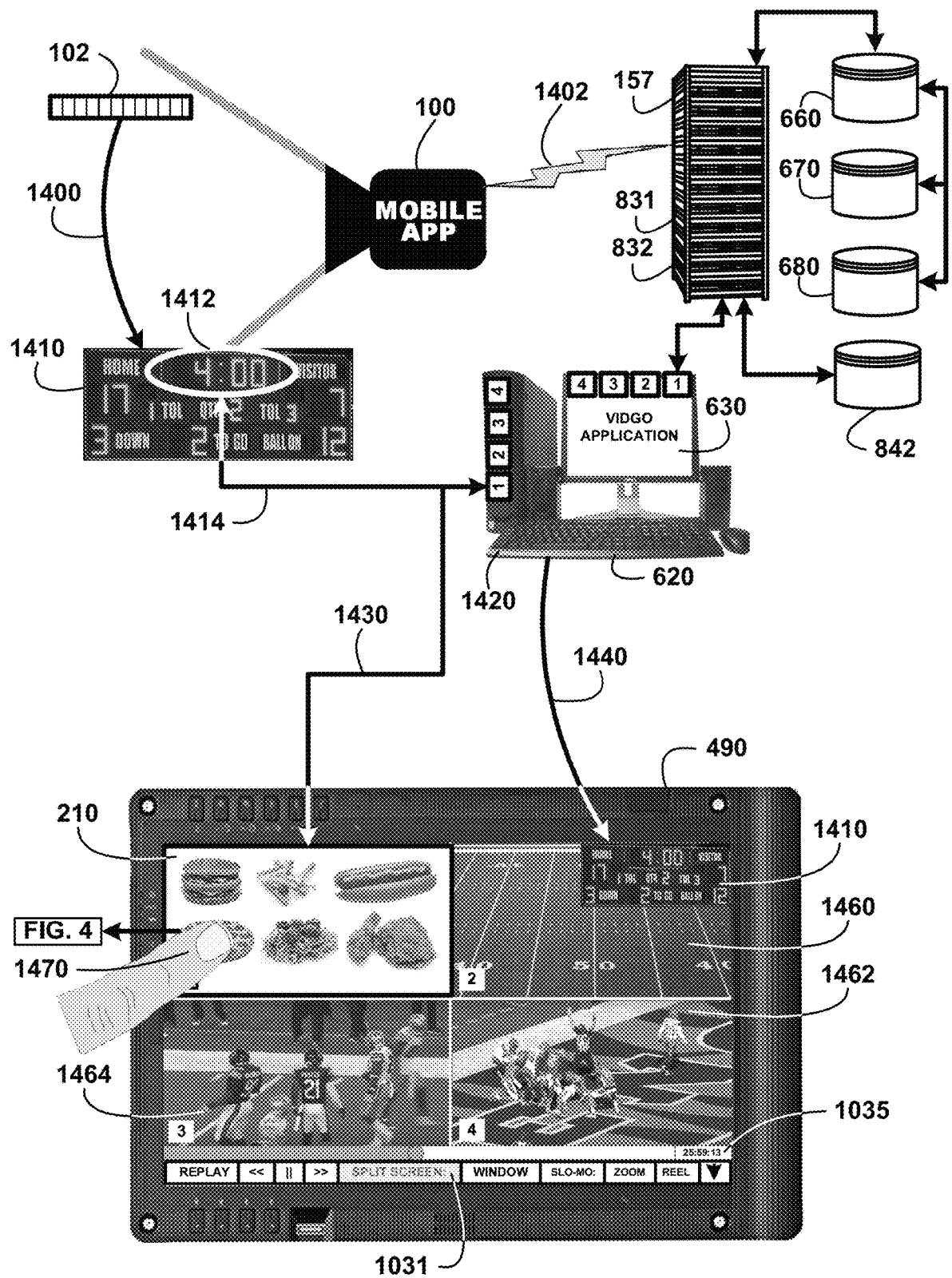
FIG. 14 shows for illustrative purposes only an example of auto ad mixing timing of one embodiment.

Auto Ad Mixing Timing:

FIG. 14 shows for illustrative purposes only an example of auto ad mixing timing of one embodiment. FIG. 14 shows the camera #1 with mobile app installed 100, scoreboard 102, VIDGO network server 157, video camera #3 and #4 captured footage is recorded in a full reel database 660, video camera #2 auto highlight selections are recorded in a second auto highlights database 670 and video camera #1 auto highlight selections are recorded in a first auto highlights database 680. A cellular transmission of a mobile app live video streaming game broadcast from each camera is received by a VIDGO network computer 620 coupled to a VIDGO network server 157. A VIDGO network computer 620 coupled to a VIDGO network server 157 receives a captured scoreboard image 1400 from the camera #1 mobile app live video streaming game broadcast 1402. The scoreboard image 1410 includes the game clock 1412.

When the game clock 1412 is stopped the VIDGO network server 157 processes the start of a split screen mode and displays the scoreboard and a camera section with no motion to use for advertising. Camera #2 live-streaming remains displayed 1460, camera #3 live-streaming remains displayed 1462 and camera #4 live-streaming remains displayed 1464 in the split screen 1031. The game clock image is processed 1414 using the at least one digital processor 831 and at least one OCR device 832. It is determined the game clock 1412 is stopped.

The at least one advertising database 842 downloads the advertising menu 1420 and displays the advertising menu wherein the subscribed viewer selects food service 1430. A subscribed viewer taps a finger on the pizza in the food service advertisers menu 1470. For the type of food the subscribed viewer selects the food service advertisers 210 in the locale are listed. The subscribed viewer pizza selection takes the viewer to the ordering process shown in FIG. 4. When the game clock 1412 begins to run again the mobile app live video streaming game broadcast 1402 continues on the split screen as shown in FIG. 4 of one embodiment.

Figure 15:
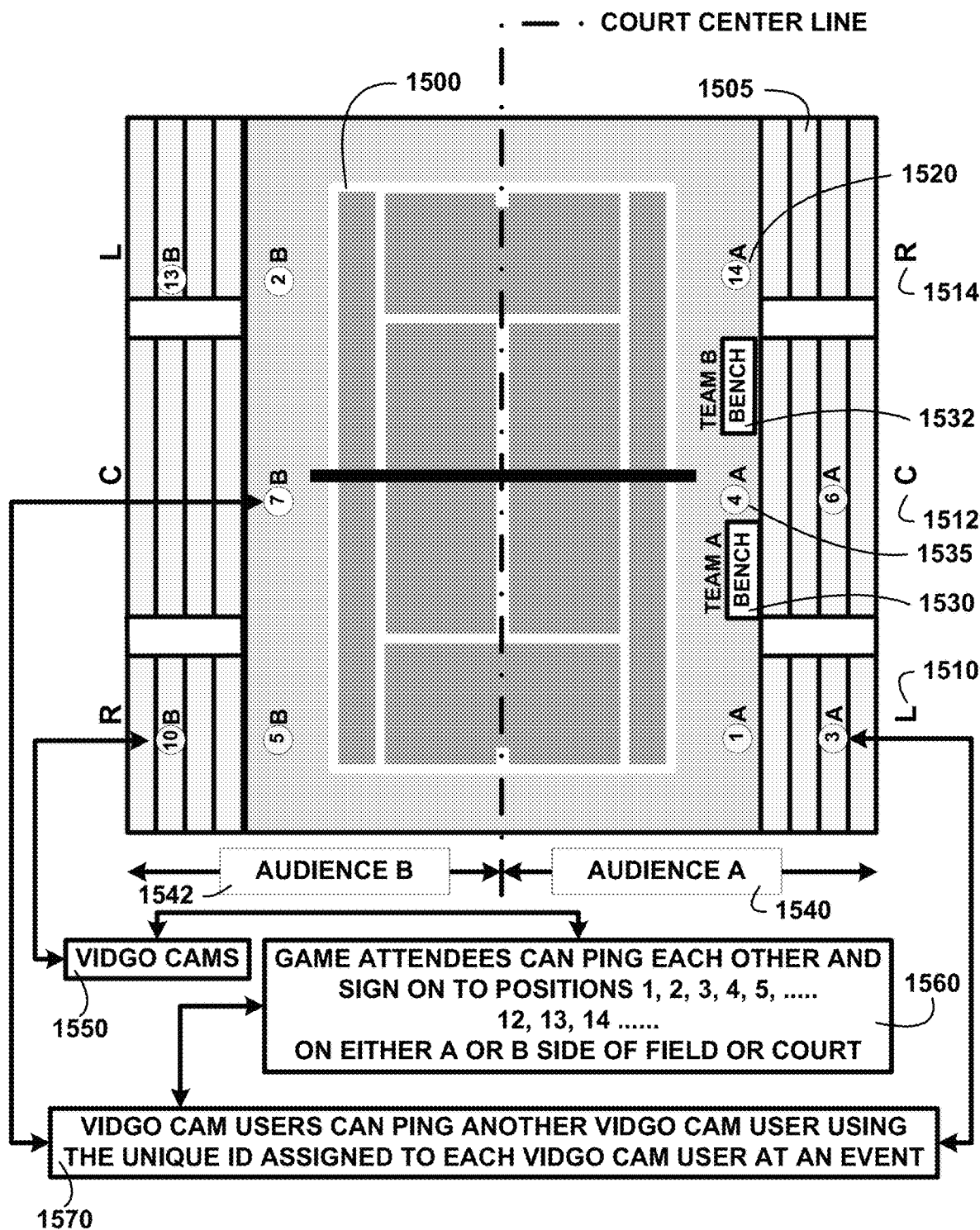
FIG. 15 shows for illustrative purposes only an example of a VIDGO cam user position selection of one embodiment.

VIDGO Cam Users Position Selection:

FIG. 15 shows for illustrative purposes only an example of an overview of VIDGO cam user position selection of one embodiment. FIG. 15 shows a tennis court 1500 and grand stands 1505 for attendee seating. The VIDGO network server 157 of FIG. 1 can receive cellular video transmissions from at least one VIDGO cam position 1520. The cellular video transmissions from the at least one VIDGO cam position 1520 are recorded in at least one database 158 of FIG. 1 of the VIDGO network server 157 of FIG. 1 of one embodiment.

The VIDGO application 180 of FIG. 1 sets-up the venue location, designated camera locations and user selection sign-up of the camera locations prior to an event. A mobile application user by selecting an event camera location grants the application permission to access the user camera device and captured video during the event until the user signs-out. The mobile application user also grants permission to locate the user and their device at the venue via a location finder and to identify the user by a unique ID assigned for the event and allows other mobile application users with event camera locations to ping and call them during the event. The VIDGO application 180 of FIG. 1 can distinguish each assigned camera location user to one or more teams according to the camera location they have selected.

Each VIDGO application user that has selected a camera position further agrees to abide by a VIDGO application 180 of FIG. 1 code of conduct to conduct themselves in a manner that does not interfere with the event activities including not entering the playing field or court, engage in any uncivil conduct physical or verbal with any persons at the event, cooperate with coaches and officials directions and recognize their contribution to the event by making the capture videos available to the event participants and those that could not attend.

GPS coordinates for each assigned at least one VIDGO cam position 1520 are calculated using at least one server digital processor 642 of FIG. 6 by scaling distances from a sports venue GPS locator GPS coordinate determination. Each of the at least one VIDGO cam position 1520 can locate another VIDGO cam position 1520 at the sports venue using the calculated GPS coordinates and pinging a unique ID assigned to each VIDGO cam user at an event 1570. Each of the VIDGO cam users when in position can broadcast the GPS location using the VIDGO application 180 of FIG. 1 of their for example smart phone to the other VIDGO cam users. The VIDGO cam user's device GPS location can be displayed on the event sports venue display on the VIDGO application 180 of FIG. 1 and identified by their assigned unique ID.

One of the at least one VIDGO cam position 1520 can be designated as an event VIDGO cam coordinator position 1535. The user selecting the event VIDGO cam coordinator position 1535 can communicate with the other VIDGO cam users at the event to ensure coverage of the event. For example if one of the VIDGO cam users has to unexpectedly leave the event early due to an emergency the event VIDGO cam coordinator can request one of more of the remaining VIDGO cam users to shift positions to roam with the action of the play.

VIDGO camera positions are divided between left L 1510, center C 1512 and right R 1514 areas of the tennis court 1500 side lines. A VIDGO cam position 1520 is shown along with other positions a tennis match attendee can sign on for to capture video of the match for the VIDGO live video streaming game broadcast 172 of FIG. 1. VIDGO cam user positions are split into team A and team B according to which audience side of the court or field their camera position is located including audience A 1540 and audience B 1542. A team A bench 1530 and team B bench 1532 provides seating for the teams during breaks in the matches. VIDGO cams 1550 can include a smart phone 800 of FIG. 8. Game attendees can ping each other and sign on to positions 1, 2, 3, 4, 5, . . . 12, 13, 14 . . . on either A or B side of field or court 1560. VIDGO cam users can ping another VIDGO cam user using the unique ID assigned to each VIDGO cam user at an event 1570 of one embodiment.

Figure 16A:
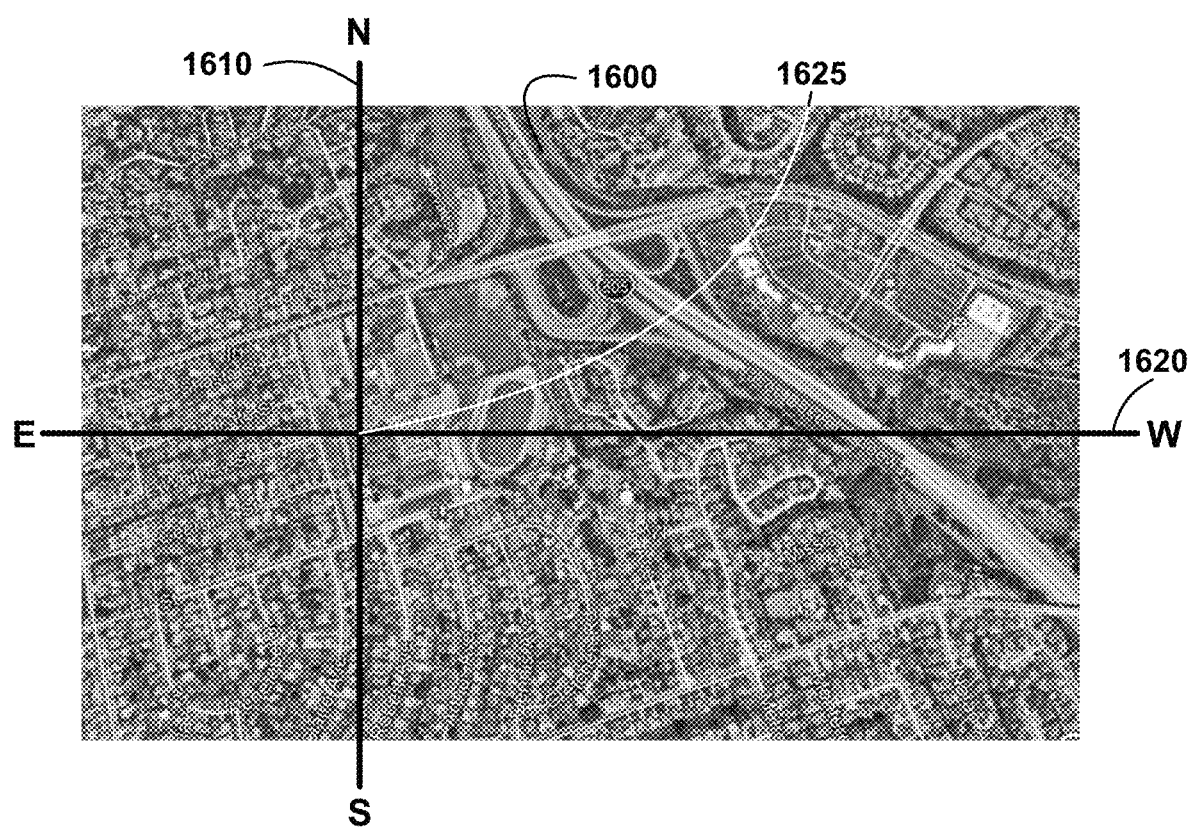
FIG. 16A shows for illustrative purposes only an example of a school location GPS search of one embodiment.

School Location GPS Search:

FIG. 16A shows for illustrative purposes only an example of a school location GPS search of one embodiment. FIG. 16A shows a school aerial map GPS location 1600 including a first North-South longitude GPS coordinate line 1610 and a first East-West latitude GPS coordinate line 1620. The crossing point of the first North-South longitude GPS coordinate line 1610 and the first East-West latitude GPS coordinate line 1620 is the location of the first GPS coordinates 1625 of one embodiment.

Figure 16B:
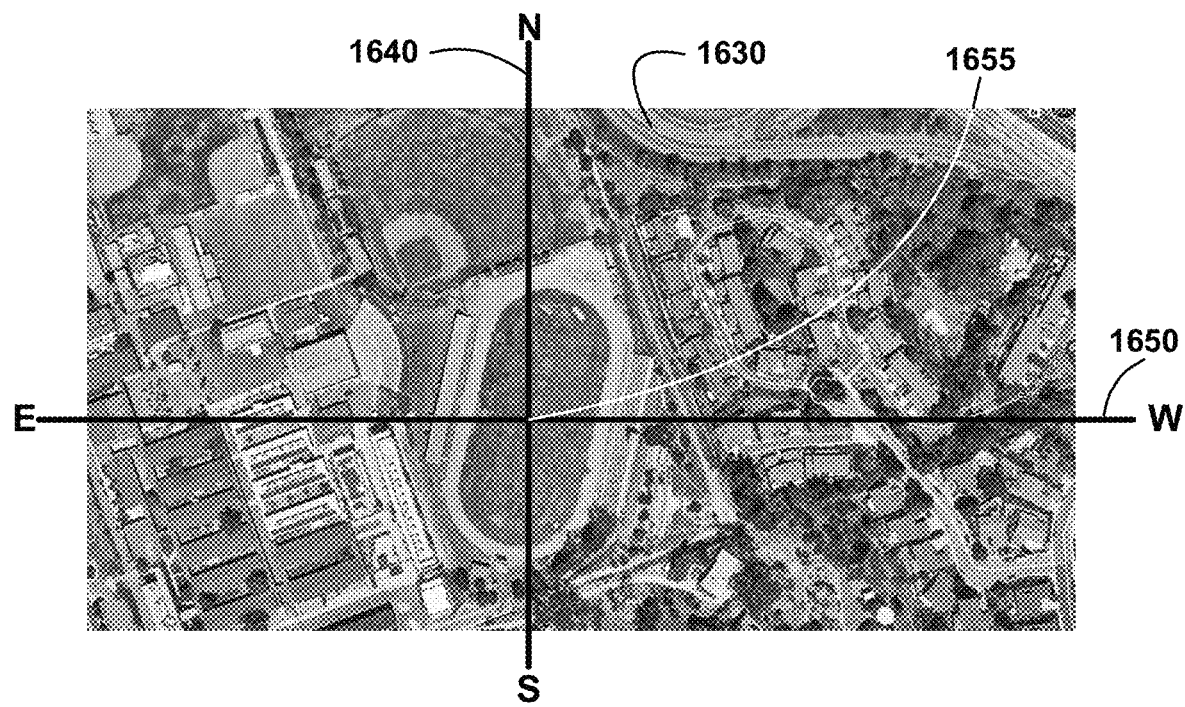
FIG. 16B shows for illustrative purposes only an example of a school sports venue locator of one embodiment.

School Sports Venue Locator:

FIG. 16B shows for illustrative purposes only an example of a school sports venue locator of one embodiment. FIG. 16B shows a school football field aerial map GPS location 1630 found with a scan of the school aerial map GPS location 1600 of FIG. 16A which detected the football field. The detected school football field aerial map GPS location 1630 includes a second north-south longitude GPS coordinate line 1640 and second east-west latitude GPS coordinate line 1650. The crossing point of the second North-South longitude GPS coordinate line 1640 and the second East-West latitude GPS coordinate line 1650 is the location of the second GPS coordinates 1655 of the sports venue of one embodiment.

Figure 17A:
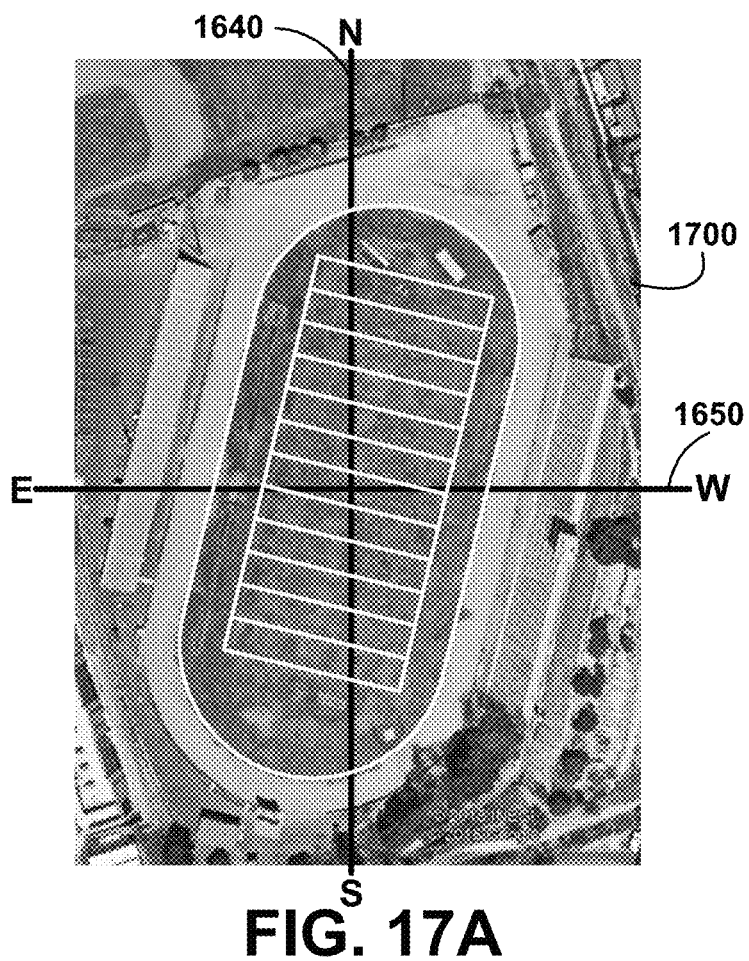
FIG. 17A shows for illustrative purposes only an example of a school football field sports venue identification of one embodiment.

School Football Field Sports Venue Identification:

FIG. 17A shows for illustrative purposes only an example of a school football field sports venue identification of one embodiment. FIG. 17A shows a school football field aerial map GPS identification 1700 using the second north-south longitude GPS coordinate line 1640 and second east-west latitude GPS coordinate line 1650 using a sports venue recognition template 1730. The VIDGO application 180 of FIG. 1 displays a sports venue recognition template 1730 overlay and can display the GPS coordinates for each assigned at least one VIDGO cam position 1520 of FIG. 15 of one embodiment.

Figure 17B:
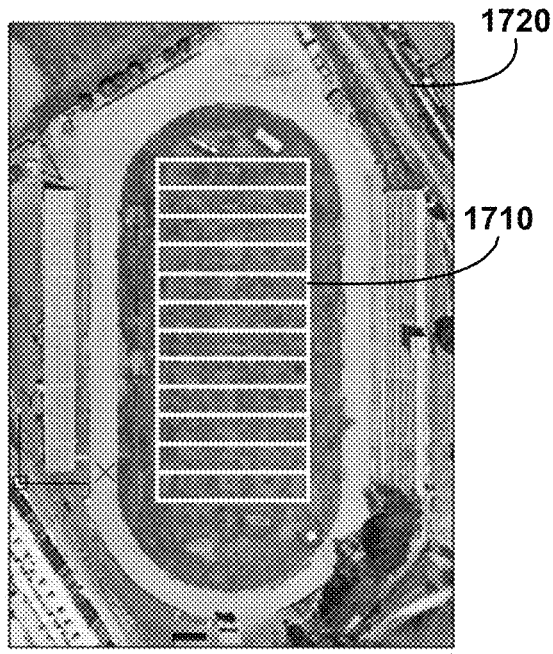
FIG. 17B shows for illustrative purposes only an example of a sports venue N-S orientation of one embodiment.

Sports Venue N-S Orientation:

FIG. 17B shows for illustrative purposes only an example of a sports venue N-S orientation of one embodiment. FIG. 17B shows an N-S vertical orientation realignment 1720 of the school football field aerial map GPS identification 1700 of FIG. 17A. The N-S vertical orientation realignment 1720 is used with the matching football field grid lines to recognition template 1710 to assign VIDGO camera positions at the identified sports venue for attendee sign-ons of one embodiment.

Figure 17C:
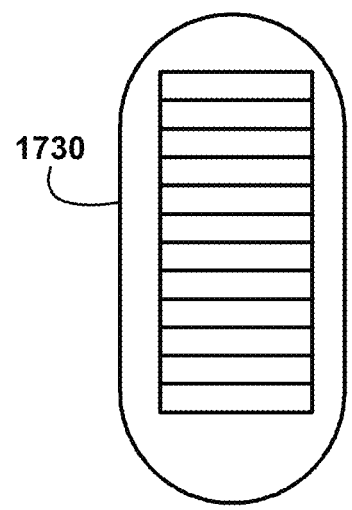
FIG. 17C shows for illustrative purposes only an example of a football field sports venue recognition template of one embodiment.

Football Field Sports Venue Recognition Template:

FIG. 17C shows for illustrative purposes only an example of a football field sports venue recognition template of one embodiment. FIG. 17C shows a football field recognition template 1730 used for identifying a football field sports venue. The VIDGO application 180 of FIG. 1 displays a sports venue recognition template 1730 overlay and can display the GPS coordinates for each assigned at least one VIDGO cam position 1520 of FIG. 15 of one embodiment.

Figure 18A:
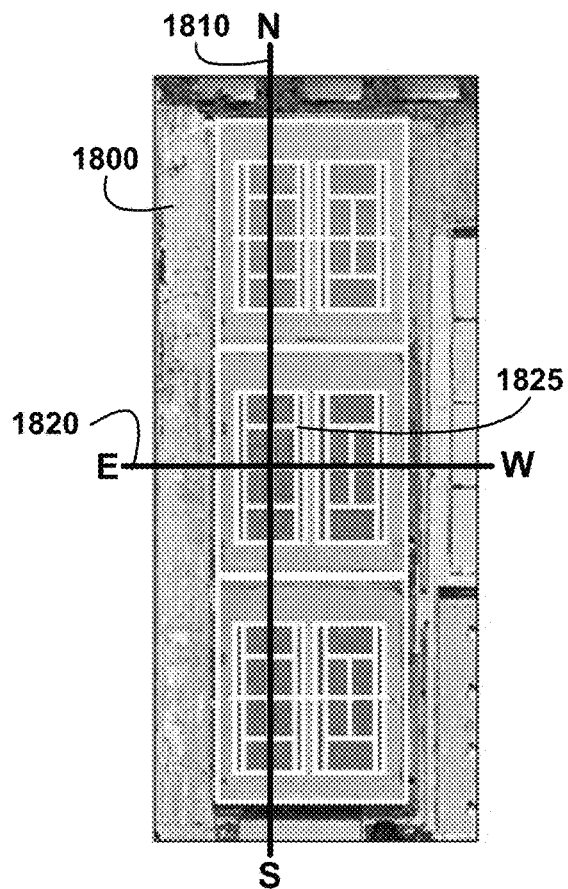
FIG. 18A shows for illustrative purposes only an example of a school tennis sports venue locator of one embodiment.

School Tennis Sports Venue Locator:

FIG. 18A shows for illustrative purposes only an example of a school tennis sports venue locator of one embodiment. FIG. 18A shows a school tennis court sports venue aerial map GPS location 1800 that has been vertically oriented. The school tennis court sports venue aerial map GPS location 1800 includes a tennis court north-south longitude GPS coordinate line 1810 and tennis court east-west latitude GPS coordinate line 1820. The courts have been identified using a matching tennis court lines to recognition template 1825 of one embodiment.

Figure 18B:
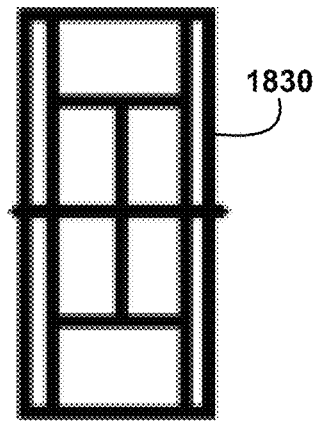
FIG. 18B shows for illustrative purposes only an example of a tennis court sports venue recognition template of one embodiment.

Tennis Court Sports Venue Recognition Template:

FIG. 18B shows for illustrative purposes only an example of a tennis court sports venue recognition template of one embodiment. FIG. 18B shows a tennis court recognition template 1830 used to identify the school tennis courts sports venue of one embodiment.

Figure 18C:
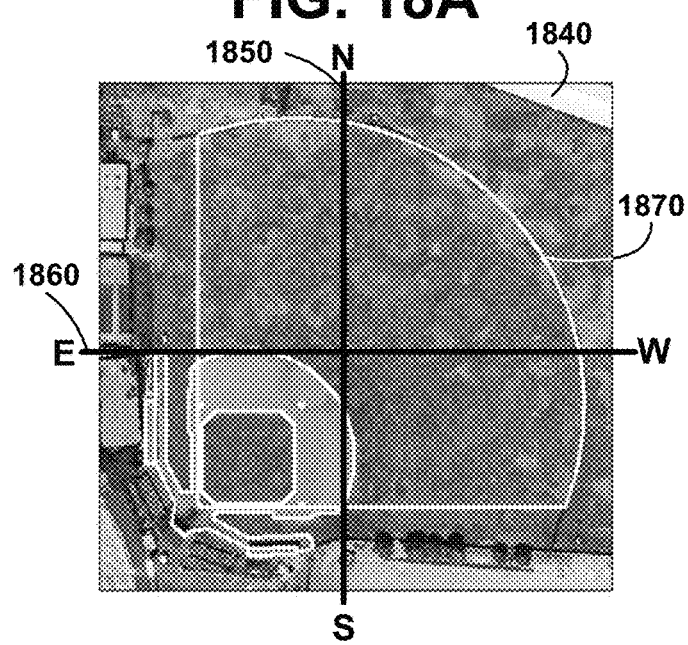
FIG. 18C shows for illustrative purposes only an example of a school baseball sports venue locator of one embodiment.

School Baseball Sports Venue Locator:

FIG. 18C shows for illustrative purposes only an example of a school baseball sports venue locator of one embodiment. FIG. 18C shows a school baseball field sports venue aerial map GPS location 1840 that has been vertically oriented. The school baseball field sports venue aerial map GPS location 1840 includes a baseball field north-south longitude GPS coordinate line 1850 and baseball field east-west latitude GPS coordinate line 1860. The baseball field has been identified using a matching baseball field lines to recognition template 1870 of one embodiment.

Figure 18D:
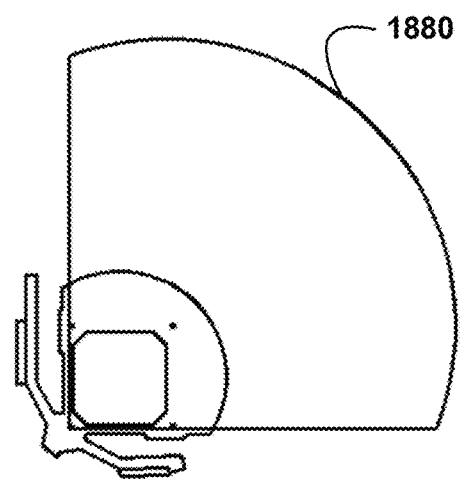
FIG. 18D shows for illustrative purposes only an example of a baseball field sports venue recognition template of one embodiment.

Baseball Field Sports Venue Recognition Template:

FIG. 18D shows for illustrative purposes only an example of a baseball field sports venue recognition template of one embodiment. FIG. 18D shows a baseball field recognition template 1880 used to identify the school baseball field sports venue of one embodiment.

Live Streaming Example of Data Usage

Figure 19:
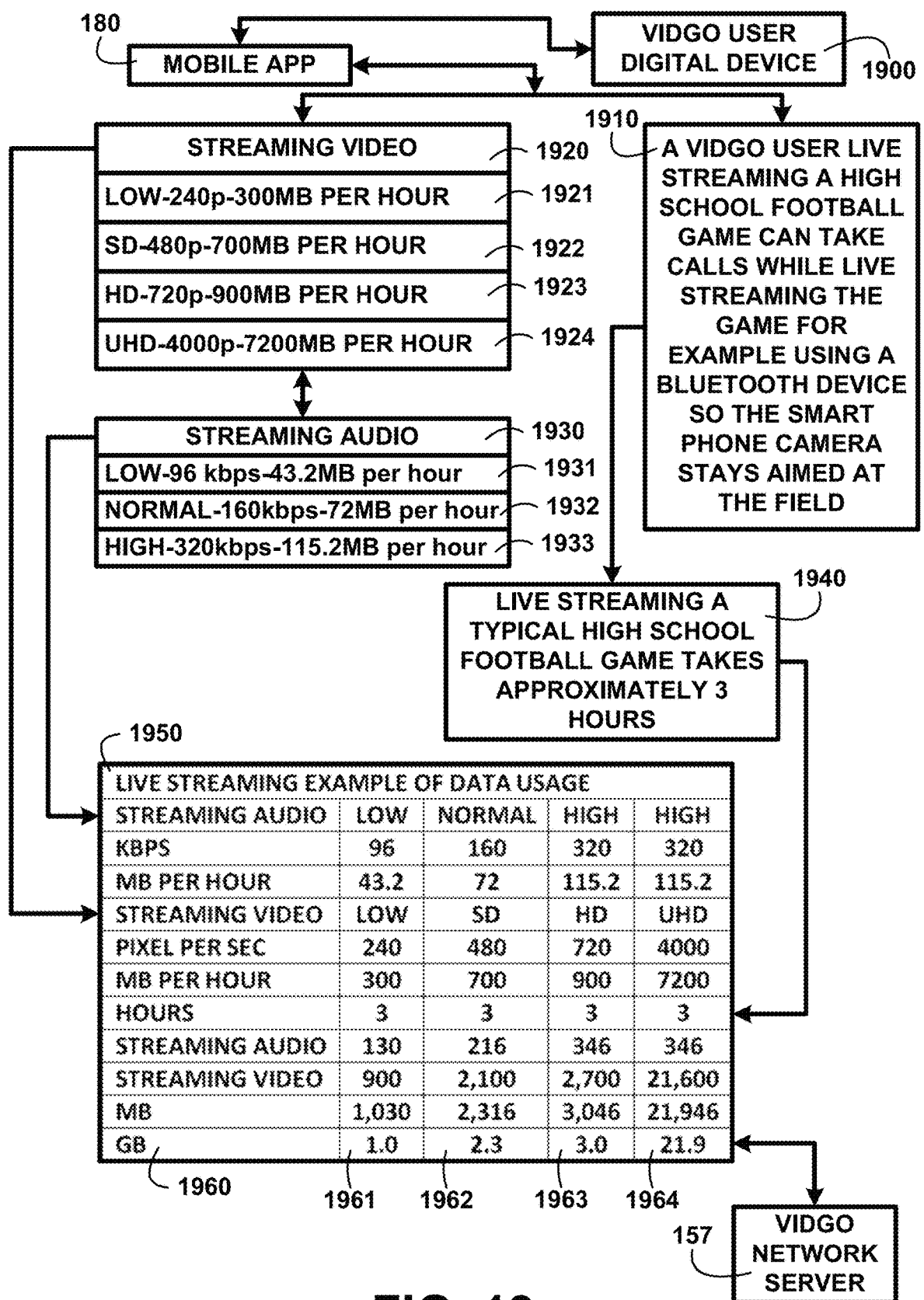
FIG. 19 shows a block diagram for illustrative purposes only an example of live streaming example of data usage of one embodiment.

FIG. 19 shows for illustrative purposes only an example of live streaming example of data usage of one embodiment. FIG. 19 shows the VIDGO app 180 used on a VIDGO user digital device 1900. A VIDGO user live streaming a high school football game can take calls while live streaming the game for example using a Bluetooth device so the smart phone camera stays aimed at the field 1910. For example smart phone and other digital devices are generally sign into a data service provider. Data service plans vary. A VIDGO cam user can adjust the amount of data being used while capturing the live video streaming of an event.

Typical data usage rates per hour include for example streaming video 1920 at different quality definition level usage rates including LOW-240p-300 mb per hour 1921, SD-480p-700 mb per hour 1922, HD-720p-900 mb per hour 1923, UHD-4000p-7200 mb per hour 1924. Data use also includes streaming audio 1930 at different quality level usage rates per hour including low-96 kbps-43.2 mb per hour 1931, normal-160 kbps-72 mb per hour 1932, and high-320 kbps-115.2 mb per hour 1933. Live streaming a typical high school football game takes approximately 3 hours 1940.

The 3 hour duration of a typical high school football game puts a range of live streaming example of data usage 1950 in data units for example gigabits GB 1960 based on video quality including low, normal, high definition and ultra-high definition for averages including in GB 1.0 1961, 2.3 1962, 3.0 1963 and 21.9 1964. The VIDGO cam user can determine the quality level to regulate the data usage to avoid additional charges from their data service provider. The VIDGO live video streaming game broadcast 172 of FIG. 1 is recorded and stored in databases at the quality level set by the VIDGO cam user in the VIDGO network server 157 of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A computer-implemented method for determining athletic performance of players, comprising the steps of:
   receiving from plural users, multiple different live streaming video views of the players participating in a sporting event in a first memory location;
   receiving tracking information about at least one sports equipment used in the sporting event by the players from at least one sensor coupled to the at least one sports equipment in a second memory location;
   generating, with a processor, synchronized data of the tracking information and the multiple different live streaming video views;
   comparing, with the processor, the synchronized data to known athletic performance data stored in a third memory location, to determine statistical data of the players associated with the sporting event; and
   converting the statistical data to athletic data analytic performance of the players.

2. The computer-implemented method of claim 1, wherein the processor is coupled to at least one network server for generating the synchronized data from video views with different viewpoints and camera angles.

3. The computer-implemented method of claim 1, wherein the processor is coupled to at least one OCR device to convert field of play line markings into an electronic graphic overlay of the field of play.

4. The computer-implemented method of claim 1, wherein the athletic data analytic performance is related to predetermined scouting information.

5. The computer-implemented method of claim 1, wherein the statistical data of the players associated with the sporting event includes physical movement, proximity, actual path, speed, projected path, time duration and distance information of the players and sports equipment.

6. The computer-implemented method of claim 1, further comprising a network server, including at least one digital processor, at least one video device, at least one OCR device for identifying matching points on the adjacent camera viewpoints, and wherein the at least one video device is configured to broadcast replays to users of the synchronized data from video views with different viewpoints and camera angles.

7. The computer-implemented method of claim 1, further comprising installing a collaboration app on the plural users mobile devices for capturing GPS coordinates for orienting different viewpoints and camera angles for synchronizing data and GPS elevations of at least one sensor coupled to the at least one sports equipment for statistical data.

8. The computer-implemented method of claim 1, wherein the multiple different live streaming video views in a sporting event stored in the first memory location are used for future replay and further processing.

9. The computer-implemented method of claim 1, further comprising matching the sports equipment being tracked to the players positions on a field of play.

10. The computer-implemented method of claim 1, further comprising storing in the second memory location sizes, shapes, materials and colors of basic sports equipment for identifying and locating basic sports equipment.

11. A system for determining athletic performance of players, comprising:
a first memory configured to receive from plural users, multiple different live streaming video views of the players participating in a sporting event;
a second memory configured to receive tracking information about at least one sports equipment used in the sporting event by the players from at least one sensor coupled to the at least one sports equipment;
a processor configured to generate synchronized data of the tracking information and the multiple different live streaming video views;
wherein the processor is further configured to compare the synchronized data to known athletic performance data stored in a third memory location to determine statistical data of the players associated with the sporting event;
wherein the processor is further configured to convert the statistical data to athletic data analytic performance of the players; and
wherein the statistical data of the players associated with the sporting event includes actual and projected speed, path, time and distance information of the players and sports equipment and wherein the athletic data analytic performance of the players includes advanced metrics of the players and sports equipment.

12. The system for determining athletic performance of players of claim 11, wherein the processor is coupled to at least one video device, and wherein the at least one video device is configured to broadcast replays to users of the synchronized data from video views with different viewpoints and camera angles.

13. The system for determining athletic performance of players of claim 11, wherein the second memory is further configured to receive tracking information about at least one sports equipment used in the sporting event includes a video recognition device configured to identify the at least one sports equipment from stored second memory location data of sizes, shapes, materials and colors of basic sports equipment.

14. The system for determining athletic performance of players of claim 11, wherein the processor is further configured to store the synchronized data of multiple different live streaming video views in a sporting event in the second memory for future replay and further processing.

15. The system for determining athletic performance of players of claim 11, wherein the synchronized data of multiple different live streaming video views in a sporting event and statistical data advanced metrics of the players associated with the sporting event stored in the second memory may be shared with other users including collegiate scouts.

16. A system for determining athletic performance of players, comprising:
a mobile application operating on plural mobile devices, each having a video camera, a microprocessor, a transmitting device and memory, wherein each mobile application is coupled to a remote server with a server processor via each transmitting device;
wherein the memory of each mobile device is configured to receive from plural users, multiple different live streaming video views of the players participating in a sporting event from each video camera;
wherein the memory of each mobile device is further configured to receive from plural users, tracking information about at least one sports equipment used in the sporting event by the players from at least one sensor coupled to the at least one sports equipment;
wherein the memory of each mobile device is further configured to transmit to the remote server, via each respective transmitting device, respective multiple different live streaming video views and respective tracking information;
wherein the remote server processor is configured to generate synchronized data of the tracking information and the multiple different live streaming video views and compare the synchronized data to known athletic performance data to determine statistical data of the players associated with the sporting event;
wherein the remote processor is further configured to convert the statistical data to athletic data analytic performance of the players; and
wherein the statistical data of the players associated with the sporting event includes actual and projected speed, path, time and distance information of the players and sports equipment and wherein the athletic data analytic performance of the players includes advanced metrics of the players and sports equipment.

17. The system for determining athletic performance of players of claim 16, wherein the mobile application coupled to the remote server with a server processor is further configured to determine angles, elevations, direction, and speed of a sports equipment and players in proximity to the sports equipment.

18. The system for determining athletic performance of players of claim 16, wherein the remote server is further configured to include at least one database to store the mobile application operating on plural mobile devices multiple different live streaming video views for future replay and further processing.

19. The system for determining athletic performance of players of claim 16, wherein the memory of mobile devices is further configured to record multi-camera live-streaming video camera captured game footage of interviews with sports coaches and players.

20. The system for determining athletic performance of players of claim 16, further comprising a drone mounted video camera configured for recording elevation, speed, and direction of the aerial viewpoint for use in determining data for synchronizing multiple video footage viewpoints and camera angles.

* * * * *